(12) United States Patent
Okada et al.

(10) Patent No.: US 8,617,297 B2
(45) Date of Patent: *Dec. 31, 2013

(54) CO₂-FACILITATED TRANSPORT MEMBRANE AND METHOD FOR PRODUCING THE SAME

(71) Applicant: Renaissance Energy Research Corporation, Kyoto (JP)

(72) Inventors: Osamu Okada, Osaka (JP); Masaaki Teramoto, Osaka (JP); Reza Yegani, Osaka (JP); Hideto Matsuyama, Kobe Hyogo (JP); Keiko Shimada, Osaka (JP); Kaori Morimoto, Osaka (JP)

(73) Assignee: Renaissance Energy Research Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,913

(22) Filed: Jan. 16, 2013

(65) Prior Publication Data

US 2013/0160650 A1 Jun. 27, 2013

Related U.S. Application Data

(63) Continuation of application No. 13/462,549, filed on May 2, 2012, now Pat. No. 8,377,170, which is a continuation of application No. 12/864,232, filed as application No. PCT/JP2009/051000 on Jan. 22, 2009, now Pat. No. 8,197,576.

(30) Foreign Application Priority Data

Jan. 24, 2008 (JP) ................... 2008-013722

(51) Int. Cl.
   *B01D 53/22* (2006.01)
   *B01D 71/06* (2006.01)
   *B01D 69/12* (2006.01)

(52) U.S. Cl.
   USPC .................. 96/12; 96/4; 96/10; 96/11; 96/13; 95/45; 95/51; 427/244; 156/280

(58) Field of Classification Search
   USPC ............ 95/43, 44, 45, 51; 96/4, 8, 10, 11, 12, 96/13, 14; 427/244, 245, 246, 372.2, 384, 427/340; 156/280
   See application file for complete search history.

(56) References Cited

U.S. PATENT DOCUMENTS

| 3,396,510 | A | 8/1968 | Ward, III et al. |
| 4,456,708 | A | 6/1984 | Wydeven et al. |

(Continued)

FOREIGN PATENT DOCUMENTS

| JP | 01-102036 A | 4/1989 |
| JP | 7112122 A | 5/1995 |

(Continued)

OTHER PUBLICATIONS

Matsumiya et al, Maku vol. 30(1), 46-51 (2005), 14 pages (English translation).

(Continued)

*Primary Examiner* — Jason M Greene
(74) *Attorney, Agent, or Firm* — Haynes Beffel & Wolfeld LLP

(57) ABSTRACT

A CO₂-facilitated transport membrane of excellent carbon dioxide permeability and CO₂/H₂ selectivity, which can be applied to a CO₂ permeable membrane reactor, is stably provided. The CO₂-facilitated transport membrane is formed such that a gel layer 1 obtained by adding cesium carbonate to a polyvinyl alcohol-polyacrylic acid copolymer gel membrane is supported by a hydrophilic porous membrane 2. More preferably, a gel layer supported by a hydrophilic porous membrane 2 is coated with hydrophilic porous membranes 3 and 4.

9 Claims, 21 Drawing Sheets

(56) References Cited

U.S. PATENT DOCUMENTS

| | | |
|---|---|---|
| 4,802,988 A | 2/1989 | Bartels et al. |
| 5,409,525 A | 4/1995 | Kazama et al. |
| 5,445,669 A * | 8/1995 | Nakabayashi et al. ............... 96/5 |
| 6,579,331 B1 | 6/2003 | Ho |
| 6,579,343 B2 | 6/2003 | Brennecke et al. |
| 6,716,270 B2 | 4/2004 | Ding et al. |
| 7,572,318 B2 | 8/2009 | Jadhav et al. |
| 8,197,576 B2 * | 6/2012 | Okada et al. ....................... 95/51 |
| 2006/0090650 A1 * | 5/2006 | Yamakawa et al. ............... 96/11 |

FOREIGN PATENT DOCUMENTS

| | | |
|---|---|---|
| JP | 9-267017 A | 10/1997 |
| JP | 2000-229219 A | 8/2000 |
| JP | 2001-120940 A | 5/2001 |
| JP | 2001511430 T | 8/2001 |
| JP | 2005-040753 A | 2/2005 |
| JP | 2007-154153 A | 6/2007 |
| JP | 2008-36463 A | 8/2009 |
| JP | 2008-36464 A | 8/2009 |

OTHER PUBLICATIONS

European Search Report for Application No. 09704533.0-2113/2239048, May 16, 2011, 5 pages.

Matsumiya et al., "Facilitated Transport of $CO_2$ through Gel-coated Liquid Membranes Using 2,3-diaminopropionic Acid as Carrier", Membrane, vol. 30, pp. 46-51, 2005.

Yegani R. et al., "Selective separation of $CO_2$ by using novel facilitated transport membrane at elevated temperatures and pressures," J. Membrane Science 291 (2007) 157-164.

* cited by examiner

Pressure at the feed side (kPa)

CO$_2$-FACILITATED TRANSPORT MEMBRANE AND METHOD FOR PRODUCING THE SAME

CROSS-REFERENCE TO RELATED APPLICATIONS

This application is a continuation of U.S. patent application Ser. No. 13/462,549 filed on 2 May 2012 (Now U.S. Pat. No. 8,377,170), which application is a continuation of U.S. patent application Ser. No. 12/864,232 (now U.S. Pat. No. 8,197,576), which is a National Phase filing under 35 U.S.C. §371 of International Application No. PCT/JP2009/051000 filed on Jan. 22, 2009 (now WO 2009/093666), which claims priority to Japanese Patent Application No. 2008-013722 filed on Jan. 24, 2008.

TECHNICAL FIELD

The present invention relates to a CO$_2$-facilitated transport membrane used to separate carbon dioxide, and more particularly to a CO$_2$-facilitated transport membrane which can separate carbon dioxide contained in a reformed gas for a fuel cell, containing hydrogen as a main component with high selectivity for carbon dioxide over hydrogen.

BACKGROUND ART

Heretofore, a method for selectively separating carbon dioxide has widely been studied because of its wide application range. For example, purity of hydrogen can be improved by selectively separating carbon dioxide from a reformed gas for a fuel cell. Further, it is expected that the progression of global warming may be suppressed by selectively separating carbon dioxide which is one of causes of global warming, and storing the separated carbon dioxide on the sea bottom.

Looking at the hydrogen production process, in a reforming system for a hydrogen station, which is currently been developed, hydrogen is produced by reforming hydrocarbon into hydrogen and carbon monoxide (CO) through steam reforming, and reacting carbon monoxide with steam using a CO shift reaction.

In a conventional CO shift reactor, the cause for inhibition of miniaturization and reduction of the start-up time is considered that a large amount of a CO shift catalyst is necessary because of the restriction on chemical equilibrium of the CO shift reaction represented by (Chemical Formula 1) shown below. For example, 20 L of a reforming catalyst is required in a 50 kW reforming system for phosphoric acid fuel cell (PAFC), whereas, an about 4-fold amount (77 L) of a CO shift catalyst is required. This is a large factor, which inhibits miniaturization of the CO shift reactor and reduction of the start-up time. The symbol "⇔" means a reversible reaction.

CO+H$_2$O⇔CO$_2$+H$_2$   Chemical Formula 1

Therefore, when a CO shift reactor is equipped with a CO$_2$-facilitated transport membrane capable of being selectively permeated by carbon dioxide and when carbon dioxide at the right side produced by the CO shift reaction of Chemical Formula 1 shown above is efficiently removed out of the CO shift reactor, chemical equilibrium can be shifted to the hydrogen production side (right side) to obtain a high conversion ratio at the same reaction temperature, thus making it possible to remove carbon monoxide and carbon dioxide over limitation due to the restriction of equilibrium. This state is schematically shown in FIGS. 20 and 21A-21B.

FIGS. 21A and 21B respectively show each change in the concentration of carbon monoxide and carbon dioxide along the catalyst layer length of the CO shift reactor in the case where the CO shift reactor is equipped with a CO$_2$-facilitated transport membrane or not.

Since the above CO shift reactor (CO$_2$ permeable membrane reactor) equipped with a CO$_2$-facilitated transport membrane enables removal of carbon monoxide and carbon dioxide over limitation due to the restriction of equilibrium, it is possible to reduce a load of pressure swing adsorption (PSA) of a hydrogen station and to lower S/C (steam/carbon ratio) of the reforming reaction and CO shift, thus making it possible to reduce the cost of the entire hydrogen station and increase efficiency. Since higher performances (increase in SV) of the CO shift reaction can be achieved by being equipped with the CO$_2$-facilitated transport membrane, miniaturization of the reforming system and reduction of the start-up time can be achieved.

Example of the related art of the CO$_2$ permeable membrane reactor is disclosed in Patent Document 1 (or Patent Document 2 having the same contents published by the same inventors).

The reforming system proposed in Patent Documents 1 and 2 provides a CO$_2$-facilitated transport membrane process which is useful for purification and water gas shift reaction (CO shift reaction) of a reformed gas generated when fuels such as hydrocarbon and methanol are reformed into hydrogen for a fuel cell vehicle on the vehicle, and typical four kinds of processes are disclosed in the same Patent Documents. When hydrocarbon (containing methane) is used as a raw material, by selectively removing carbon dioxide using a membrane reactor in which a water gas shifter (CO shift reactor) is equipped with a CO$_2$-facilitated transport membrane, the reaction rate of carbon monoxide is increased and the concentration of carbon monoxide is decreased, and also purity of hydrogen thus produced is increased. Further, percentage-order carbon monoxide and carbon dioxide remaining in hydrogen produced are reacted with hydrogen in a methanator thereby converting into methane, and thus the concentrations are decreased and a decrease in efficiency of a fuel cell due to poisoning is prevented.

In Patent Documents 1 and 2, as the CO$_2$-facilitated transport membrane, a hydrophilic polymer membrane of PVA (polyvinyl alcohol) containing mainly a halogenated quaternary ammonium salt ((R)$_4$N$^+$X$^-$) as a carbon dioxide carrier is used. Example 6 of Patent Documents 1 and 2 discloses a method for producing a CO$_2$-facilitated transport membrane formed of a composite membrane of 50% by weight of a 49-μm thick PVA membrane containing 50% by weight of a tetramethylammonium fluoride salt as a carbon dioxide carrier, and a porous PTFE (polytetrafluoroethylene) membrane which supports the PVA membrane, and Example 7 discloses membrane performances of the CO$_2$-facilitated transport membrane when a mixed gas (25% CO$_2$, 75% H$_2$) is treated under a total pressure of 3 atm at 23° C. Regarding the membrane performances, CO$_2$ permeance R$_{CO2}$ is 7.2 GPU (=2.4×10$^{-6}$ mol/(m$^2$·s·kPa)) and CO$_2$/H$_2$ selectivity is 19.

Patent Document 3 shown below discloses, as a CO$_2$-facilitated transport membrane, a CO$_2$ absorbent formed by cesium carbonate in combination with amino acid.

The method for producing a CO$_2$-facilitated transport membrane described in Patent Document 3 is as follows. First, a commercially available amino acid is added to an aqueous solution of cesium carbonate so as to obtain a predetermined concentration, followed by well stirring to prepare an aqueous mixed solution. A gel-coated surface of a gel-coated porous PTFE membrane (47Φ) is then immersed in the prepared mixed solution for 30 minutes or more, and the membrane is slowly pulled up. A silicone membrane is placed on a sintered metal (for the purpose of preventing the permeation side from being wetted with the solution) and the above hydrogel membrane (47 mmΦ) is placed thereon, followed by sealing through covering with a cell with a silicone packing. A feed gas is allowed to flow at a rate of 50 cc/min over the $CO_2$-facilitated transport membrane thus produced, and the pressure of the lower side of the membrane is reduced to about 40 torr by evacuating the lower side.

In Example 4 of Patent Document 3, when a $CO_2$-facilitated transport membrane formed by cesium carbonate and 2,3-diaminopropionic acid hydrochloride at each molar concentration of 4 (mol/kg) is used, a $CO_2$ permeation rate is 1.1 ($10^{-4}$ $cm^3$(STP)/$cm^2$·s·cmHg) and a $CO_2/N_2$ separation factor is 300 under the temperature of 25° C. Since the $CO_2$ permeance $R_{CO2}$ is defined by a permeation rate per pressure difference, the $CO_2$ permeance $R_{CO2}$ in Example 4 of Patent Document 3 is calculated as 110 GPU. However, data with respect to $CO_2/H_2$ selectivity in the present Example is not disclosed.

Patent Document 4 shown below discloses a $CO_2$ separation membrane formed of a cellulose acetate membrane containing an alkali bicarbonate added therein. However, Patent Document 4 describes only about $CO_2/O_2$ selectivity and does not disclose data about $CO_2/H_2$ selectivity. Furthermore, the disclosed data are measured under the conditions of a low pressure (about 0.01 atm) and the data measured under the pressure condition of about several atm are not disclosed.

Patent Document 1: Japanese Unexamined Patent Application Publication (Translation of PCT Application) No. 2001-511430
Patent Document 2: Specification of U.S. Pat. No. 6,579,331
Patent Document 3: Japanese Unexamined Patent Application Publication No. 2000-229219
Patent Document 4: Specification of U.S. Pat. No. 3,396,510.

DISCLOSURE OF THE INVENTION

Problems to be Solved by the Invention

Since the $CO_2$-facilitated transport membrane has a basic function of selectively separating carbon dioxide, the development has been made for the purpose of absorbing or removing carbon dioxide as the cause of global warming. However, considering application of the $CO_2$-facilitated transport membrane to a $CO_2$ permeable membrane reactor, high performances are required in the working temperature, $CO_2$ permeance and $CO_2/H_2$ selectivity. Since performances of a CO shift catalyst used for the CO shift reaction tend to deteriorate with decreasing temperature, it is considered to be necessary that the working temperature is at least 100° C. In any of Patent Documents 1 to 3, membrane performances are measured under the temperature condition of about 25° C., and it cannot be said that the above patent documents disclosed the $CO_2$-facilitated transport membrane which exhibits sufficient membrane performances even under the temperature of 100° C. or higher.

High $CO_2$ permeance (one of performance indicator of carbon dioxide permeability) is required (for example, $2\times10^{-5}$ mol/($m^2$·s·kPa) (=about 60 GPU or more) so as to shift chemical equilibrium of the CO shift reaction to the hydrogen production side (right side) and to decrease the concentration of carbon monoxide and the concentration of carbon dioxide to about 0.1% or less over limitation due to the restriction of equilibrium, and to achieve higher performances (increase in SV) of the CO shift reaction. However, the $CO_2$ permeance of the $CO_2$-facilitated transport membrane described in Patent Documents 1 and 2 is the value which is far less than 10 GPU, and the above patent documents do not disclose the $CO_2$-facilitated transport membrane which exhibits the $CO_2$ permeance of about 60 GPU or more. Patent Document 3 does not disclose $CO_2/H_2$ selectivity, and also does not disclose that the $CO_2$ permeance is 60 GPU or more under the temperature condition of 100° C. or higher. Patent Document 4 does not disclose $CO_2/H_2$ selectivity, and also does not disclose data under the pressure condition of about several atm.

Furthermore, when hydrogen produced during the CO shift reaction is discharged through the $CO_2$-facilitated transport membrane, together with carbon dioxide, the process for separating and recovering hydrogen from the discharged gas is required. Since hydrogen has a molecular size smaller than that of carbon dioxide, the membrane, which enables permeation of carbon dioxide, also enables permeation of hydrogen. A facilitated transport membrane capable of selectively transporting only carbon dioxide using a carrier of carbon dioxide in the membrane is required and it is considered to be necessary that $CO_2/H_2$ selectivity is from about 90 to 100 or more.

However, the $CO_2$-facilitated transport membrane described in Patent Documents 1 and 2 has a $CO_2/H_2$ selectivity of 19, and it cannot be said to have sufficient selectivity. Since Patent Documents 3 and 4 do not disclose $CO_2/H_2$ selectivity, it cannot be said that Patent Documents 3 and 4 disclosed a $CO_2$-facilitated transport membrane which exhibits high $CO_2/H_2$ selectivity.

In light of the problems described above, an object of the present invention is to stably provide a $CO_2$-facilitated transport membrane which can be applied to a $CO_2$ permeable membrane reactor.

Means for Solving the Problem

The $CO_2$-facilitated transport membrane according to the present invention for achieving the above object is characterized in that a gel layer in which an additive of cesium carbonate or cesium bicarbonate or cesium hydroxide is added to a polyvinyl alcohol-polyacrylic acid copolymer gel membrane, is supported on the hydrophilic porous membrane.

According to the above characteristic of the $CO_2$-facilitated transport membrane of the present invention, since cesium carbonate ($Cs_2CO_3$) is contained in the polyvinyl alcohol-polyacrylic acid (PVA/PAA) copolymer gel membrane, $Cs_2CO_3$ functions as a carbon dioxide carrier capable of transporting carbon dioxide as a permeable material from the interface at the high carbon dioxide side of the PVA/PAA copolymer gel layer to the interface at the low carbon dioxide side, thus making it possible to achieve a selectivity against hydrogen ($CO_2/H_2$) of about 50 or higher at a high temperature of 100° C. or higher, and a $CO_2$ permeance of about $2\times10^{-5}$ mol/($m^2$·s·kPa) (=60 GPU) or more.

Since a porous membrane supporting a PVA/PAA gel layer is hydrophilic, a gel layer with fewer defects can be stably formed and high selectivity against hydrogen can be maintained. In general, when the porous membrane is hydrophobic, it is considered possible to prevent deterioration of membrane performances as a result of permeation of moisture in the PVA/PAA gel membrane into the pores of the porous membrane at 100° C. or lower. It is also considered that the similar effect can be expected even under the condition where the moisture content in the PVA/PAA gel membrane decreases at 100° C. or higher. Therefore, use of a hydrophobic porous membrane is recommended. However, in the $CO_2$-facilitated transport membrane of the present invention, it became possible to stably produce a $CO_2$-facilitated transport membrane, which contain less defects and can maintain high selectivity against hydrogen, by using a hydrophilic porous membrane due to the following reasons.

When a cast solution which is an aqueous solution containing a PVA/PAA copolymer and $Cs_2CO_3$ is cast on a hydrophilic porous membrane, the pores of the porous membrane are filled with the liquid, and also the cast solution is applied on the surface of the porous membrane. When this cast solution is gelated, since not only the gel layer is formed on the surface of the porous membrane, but also the pores are filled with the gel layer, defects are less likely to occur, resulting in high success rate of the formation of the gel layer.

Considering the proportion of pores (porosity) and considering that pores are not straight vertically to the surface of the membrane, but tortuous (tortuosity), since the gel layer in pores becomes large resistance to gas permeation, permeability becomes considerably low as compared with that of the gel layer on the surface of the porous membrane, the gas permeance decreases. On the other hand, when the cast solution is cast on a hydrophobic porous membrane, the pores of the porous membrane are not filled with the liquid, the cast solution is applied only on the surface of the porous membrane with the pores filled with gas. Therefore, it is presumed that the gas permeance in the gel layer on the hydrophobic porous membrane increases in both hydrogen and carbon dioxide as compared with the hydrophilic porous membrane.

However, as compared with the gel layer in pores, microdefects are likely to occur in the gel layer of the surface of the membrane and thus the success rate of the formation of the membrane decreases. Since hydrogen has a very small molecular size as compared with carbon dioxide, the permeance of hydrogen remarkably increases as compared with carbon dioxide at the microdefects. At the position other than defects, the permeance of carbon dioxide capable of permeating by a facilitated transporting mechanism is noticeably larger than that of hydrogen capable of permeating by a physical dissolution and diffusion mechanism.

As a result, selectivity against hydrogen ($CO_2/H_2$) when the hydrophobic porous membrane is used decreases as compared with the case where the hydrophilic porous membrane is used. In view of practical use, stability and durability of the $CO_2$-facilitated transport membrane become very important. Therefore, it becomes advantageous to use a hydrophilic porous membrane having high selectivity against hydrogen ($CO_2/H_2$). Use of the hydrophilic porous membrane can be realized on the assumption that high $CO_2$ permeance can be achieved by adding $Cs_2CO_3$ as a carbon dioxide carrier to a PVA/PAA gel layer.

The difference in gas permeance between the hydrophobic porous membrane and the hydrophilic porous membrane is estimated to similarly occur even for the case where a gel layer, which is prepared by gelation of a layer of a cast solution containing no $Cs_2CO_3$ as a $CO_2$ carrier, is impregnated with an aqueous $Cs_2CO_3$ solution since the situation that the gel layer in the pores has large resistance to gas permeation is the same for both cases.

As described above, according to the $CO_2$-facilitated transport membrane having the above characteristic, it becomes possible to provide a $CO_2$-facilitated transport membrane which can realize working temperature of 100° C. or higher, $CO_2$ permeance of about $2 \times 10^{-5}$ mol/(m²·s·kPa) (=60 GPU) or more and $CO_2/H_2$ selectivity of about 90 to 100 or more, and can be applied to a $CO_2$ permeable membrane reactor, and thus miniaturization of the CO shift reactor, reduction of the start-up time and higher performances (increase in SV) can be achieved.

The similar effect can also be obtained when cesium hydroxide is added as the additive in place of cesium carbonate due to the following reason. The reaction represented by Chemical Formula 2 shown below is caused by using a facilitated transport membrane including a gel layer containing cesium hydroxide added therein for separation of $CO_2$, thereby converting cesium hydroxide added in the facilitated transport membrane into cesium carbonate.

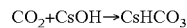

$$CO_2 + CsOH \rightarrow CsHCO_3$$

$$CsHCO_3 + CsOH \rightarrow Cs_2CO_3 + H_2O \qquad \text{Chemical formula 2}$$

Chemical formula 2 shown above can be summarized into Chemical formula 3 shown below, which shows that cesium hydroxide added is converted into cesium carbonate.

$$CO_2 + 2CsOH \rightarrow Cs_2CO_3 + H_2O \qquad \text{Chemical formula 3}$$

Furthermore, as is apparent from Chemical formula 2 shown above, the similar effect can also be obtained by adding cesium bicarbonate as the additive in place of cesium carbonate.

The $CO_2$-facilitated transport membrane according to the present invention has, in addition to the characteristic described above, another characteristic that the gel layer is formed such that a weight ratio of cesium carbonate relative to the total weight of the polyvinyl alcohol-polyacrylic acid copolymer gel membrane and cesium carbonate is 65% by weight or more and 85% by weight or less.

According to the above characteristic of the $CO_2$-facilitated transport membrane of the present invention, it becomes possible to provide a $CO_2$-facilitated transport membrane which can realize excellent $CO_2$ permeance and excellent $CO_2/H_2$ selectivity under the temperature condition of 100° C. or higher, and can be applied to a $CO_2$ permeable membrane reactor, and thus miniaturization of the CO shift reactor, reduction of the start-up time and higher performances (increase in SV) can be achieved.

The $CO_2$-facilitated transport membrane according to the present invention has, in addition to the above characteristic, another characteristic that a gel layer in which an additive of rubidium carbonate or rubidium bicarbonate or rubidium hydroxide is added to a polyvinyl alcohol-polyacrylic acid copolymer gel membrane, is supported on the hydrophilic porous membrane.

According to the above characteristic of the $CO_2$-facilitated transport membrane of the present invention, rubidium carbonate ($Rb^2CO_3$) having comparatively high solubility in water functions as a $CO_2$ carrier in the polyvinyl alcohol-polyacrylic acid (PVA/PAA) copolymer gel membrane, which transports carbon dioxide across the membrane from the interface of the high carbon dioxide concentration side to the interface of the low carbon dioxide concentration side, thus making it possible to achieve a selectivity against hydrogen ($CO_2/H_2$) of about 90 to 100 or more at a high temperature of 100° C. or higher, and a $CO_2$ permeance of about $2 \times 10^{-5}$ mol/(m²·s·kPa)(=60 GPU) or more.

The similar effect can also be obtained by adding rubidium hydroxide or rubidium bicarbonate in place of rubidium carbonate. This is because of the same reason why the same effect, as that obtained by adding cesium carbonate, can be obtained by adding cesium hydroxide or cesium bicarbonate in place of cesium carbonate.

The $CO_2$-facilitated transport membrane according to the present invention has, in addition to the above characteristic, another characteristic that the gel layer supported on the hydrophilic porous membrane is coated with a hydrophobic porous membrane.

According to the above characteristic of the $CO_2$-facilitated transport membrane of the present invention, the gel layer supported on the hydrophilic porous membrane is protected by a hydrophobic porous membrane and the strength of the $CO_2$-facilitated transport membrane increases when in use. As a result, when the $CO_2$-facilitated transport membrane is applied to a $CO_2$ permeable membrane reactor, sufficient membrane strength can be ensured even when pressure difference at both ends (inside and outside the reactor) of the $CO_2$-facilitated transport membrane increases (for example, 2 atm or more). Furthermore, since the gel layer is coated with the hydrophobic porous membrane, even when steam is condensed on the surface of the hydrophobic porous membrane, permeation of water into the gel layer is prevented because the porous membrane is hydrophobic. Therefore, the hydrophobic porous membrane prevents a carbon dioxide carrier in the gel layer from being diluted with water and the diluted carbon dioxide carrier from flowing out from the gel layer.

The $CO_2$-facilitated transport membrane according to the present invention has, in addition to the above characteristic, another characteristic that the gel layer has an aldehyde group-derived cross-linking structure.

According to the above characteristic of the $CO_2$-facilitated transport membrane of the present invention, defects are less likely to occur in the gel layer due to the cross-linking structure formed in the gel layer, resulting in drastic reduction of the $H_2$ permeance. On the other hand, the $CO_2$ permeance does not drastically decrease as compared with the $H_2$ permeance, thus making it possible to realize a facilitated transport membrane which exhibits high $CO_2/H_2$ selectivity.

The $CO_2$-facilitated transport membrane according to the present invention has, in addition to the above characteristic, another characteristic that the hydrophilic porous membrane has heat resistance at 100° C. or higher.

According to the above characteristic of the $CO_2$-facilitated transport membrane of the present invention, it becomes possible to use within a wide temperature range from normal temperature to 100° C. or higher. Specifically, it becomes possible to use it under the temperature range of 100° C. or higher because the hydrophilic porous membrane has heat resistance of 100° C. or higher.

The $CO_2$-facilitated transport membrane according to the present invention has, in addition to the above characteristic, another characteristic that both the gel layer and the hydrophilic porous membrane have a cylindrical shape with the same central axis, and one membrane is formed so as to bring an inner side face into contact with an outer side face of the other membrane thereby surrounding the other membrane.

In this case, a membrane made of ceramics such as alumina can be used as the hydrophilic porous membrane.

The gel layer can be formed outside the hydrophilic porous membrane so as to surround the hydrophilic porous membrane.

The method for producing the $CO_2$-facilitated transport membrane according to the present invention for achieving the above object is characterized by comprising the steps of preparing a cast solution which is an aqueous solution containing a polyvinyl alcohol-polyacrylic acid copolymer and cesium carbonate or cesium bicarbonate or cesium hydroxide; and forming the gel layer by casting the cast solution on a hydrophilic porous membrane, and gelating the cast solution.

The method for producing the $CO_2$-facilitated transport membrane according to the present invention for achieving the above object has another characteristic that it comprises the steps of; preparing a cast solution which is an aqueous solution containing a polyvinyl alcohol-polyacrylic acid copolymer and rubidium carbonate or rubidium bicarbonate or rubidium hydroxide; and forming the gel layer by casting the cast solution on a hydrophilic porous membrane and gelating the cast solution.

According to the above characteristic of the method for producing the $CO_2$-facilitated transport membrane of the present invention, since a cast solution in which a mixing ratio of a carbon dioxide carrier to a membrane material (PVA/PAA) is properly adjusted is prepared in advance, optimization of a final mixing ratio of the carbon dioxide carrier in the PVA/PAA gel membrane can be easily realized and improvement of membrane performances can be realized.

The method for producing the $CO_2$-facilitated transport membrane according to the present invention has, in addition to the above characteristic, another characteristic that it further comprises a step of forming a layered porous membrane in which a hydrophilic porous membrane and a hydrophobic porous membrane are laid one upon another before the beginning of the step of forming the gel layer, wherein the step of forming the gel layer includes a step of casting the cast solution on a surface of the hydrophilic porous membrane of the layered porous membrane.

According to the above characteristic of the method for producing the $CO_2$-facilitated transport membrane of the present invention, it is possible to realize a $CO_2$-facilitated transport membrane in which the gel layer supported on the hydrophilic porous membrane is protected by a hydrophobic porous membrane and the strength increases when in use.

The method for producing the $CO_2$-facilitated transport membrane according to the present invention has, in addition to the above characteristic, another characteristic that the step of preparing the cast solution further includes a step of adding a cross-linking agent having an aldehyde group to a portion of a structure.

According to the above characteristic of the method for producing the $CO_2$-facilitated transport membrane of the present invention, since the cross-linking structure is formed in the membrane, defects are less likely to occur in the membrane resulting in drastic reduction of the $H_2$ permeance, thus making it possible to realize a facilitated transport membrane which exhibits high $CO_2/H_2$ selectivity.

In this case, glutaraldehyde or formaldehyde can be employed as a cross-linking agent to be added. Glutaraldehyde is added in an amount of about 0.008 to 0.015 g based on 1 g of a PVA/PAA copolymer, and thus particularly high $CO_2/H_2$ selectivity can be exhibited.

BEST MODE FOR CARRYING OUT THE INVENTION

Each embodiment of the $CO_2$-facilitated transport membrane according to the present invention and the method for producing the same will be described with reference to the accompanying drawings.

First Embodiment

The first embodiment of the present invention will be described below.

The $CO_2$-facilitated transport membrane according to the present invention (hereinafter appropriately referred to as a "membrane of the present invention") is a $CO_2$-facilitated transport membrane which contains a carbon dioxide carrier in a gel membrane containing moisture, and can be applied to a $CO_2$ permeable membrane reactor having a working temperature of 100° C. or higher, high carbon dioxide permeability and $CO_2/H_2$ selectivity. Furthermore, in the membrane of the present invention, a hydrophilic porous membrane is employed as a supporting membrane for supporting a gel membrane containing a carbon dioxide carrier so as to stably realize high $CO_2/H_2$ selectivity.

Figure 1:
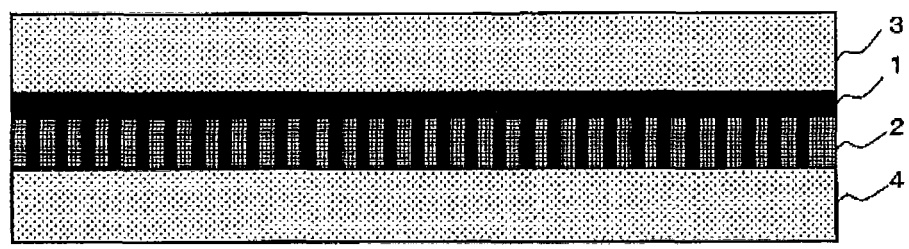
FIG. 1 is a sectional view schematically showing a structure in one embodiment of a $CO_2$-facilitated transport membrane according to the present invention.

Specifically, in the membrane of the present invention, a polyvinyl alcohol-polyacrylic acid (PVA/PAA) copolymer is used as a membrane material and cesium carbonate ($Cs_2CO_3$) is used as a carbon dioxide carrier. As schematically shown in FIG. 1, the membrane of the present invention has a three-layered structure in which a hydrophilic porous membrane 2, on which a PVA/PAA gel membrane 1 containing a carbon dioxide carrier is supported, is sandwiched between two hydrophobic porous membranes 3, 4. Hereinafter, the PVA/PAA gel membrane containing a carbon dioxide carrier is appropriately abbreviated to an "impregnated gel membrane" in order to distinguish it from a PVA/PAA gel membrane containing no carbon dioxide carrier and also from a membrane of the present invention having a structure equipped with two hydrophobic porous membranes. In the impregnated gel membrane, PVA/PAA exists in the proportion within a range from about 20 to 80% by weight and $Cs_2CO_3$ exists in the proportion within a range from about 20 to 80% by weight, based on the total weight of PVA/PAA and $Cs_2CO_3$ in the impregnated gel membrane.

The hydrophilic porous membrane preferably has, in addition to hydrophilicity, heat resistance at 100° C. or higher, mechanical strength, and tight adhesion with the impregnated gel membrane. Furthermore, the porosity is preferably within a range from 55% or more, and the pore diameter is preferably within a range from 0.1 to 1 μm. In the present embodiment, a hydrophilized polytetrafluoroethylene (PTFE) porous membrane is used as the hydrophilic porous membrane which satisfies these conditions.

The hydrophobic porous membrane preferably has, in addition to hydrophobicity, heat resistance at 100° C. or higher, mechanical strength and tight adhesion with the impregnated gel membrane. Furthermore, the porosity is preferably 55% or more and the pore diameter is preferably within a range from 0.1 to 1 μm. In the present embodiment, an unhydrophilized polytetrafluoroethylene (PTFE) porous membrane is used as the hydrophobic porous membrane which satisfies these conditions.

Figure 2:
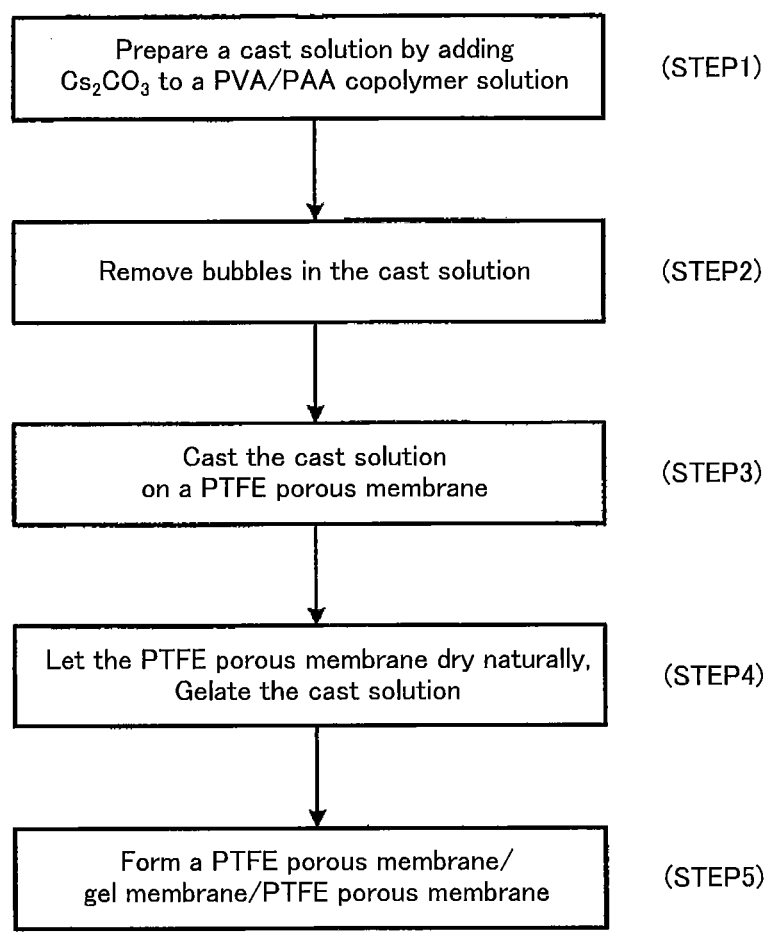
FIG. 2 is a flow chart showing a method for producing a $CO_2$-facilitated transport membrane according to the present invention.

One embodiment of the method for producing a membrane of the present invention (method of the present invention) will be described with reference to FIG. 2.

First, a cast solution which is an aqueous solution containing a PVA/PAA copolymer and $Cs_2CO_3$ is prepared (step 1). More specifically, 1 g of a PVA/PAA copolymer (for example, manufactured by Sumitomo Seika Chemicals Company, Limited under the tentative name of SS gel) and 2.33 g of $Cs_2CO_3$ are charged in a sample bottle and 20 ml of water is added, and then these components are dissolved by stirring them at room temperature for 5 days to obtain a cast solution.

Next, centrifugal separation (at a rotating speed of 5,000 rpm for 30 minutes) is conducted so as to remove bubbles in the cast solution obtained in the step 1 (step 2).

Next, the cast solution obtained in the step 2 is cast on the surface of the side of a hydrophilic PTFE porous membrane of a layered porous membrane obtained by laying a hydrophilic PTFE porous membrane (for example, manufactured by Sumitomo Electric Industries, Ltd., WPW-020-80, thickness: 80 μm, pore diameter: 0.2 μm, porosity: about 75%) on a hydrophobic PTFE porous membrane (for example, manufactured by Sumitomo Electric Industries, Ltd., Fluoropore FP010, thickness: 60 μm, pore diameter: 0.1 μm, porosity: 55%) using an applicator (step 3). A cast thickness of the sample in Examples described hereinafter is 500 μm. The cast solution permeates into pores in the hydrophilic PTFE porous membrane. However, permeation stops at the boundary of the hydrophobic PTFE porous membrane and the cast solution does not permeate to the opposite surface of the layered porous membrane. Therefore, the cast solution does not exist on the side of the hydrophobic PTFE porous membrane of the layered porous membrane and it becomes easy to handle.

After casting, the hydrophilic PTFE porous membrane is air-dried at room temperature for a day and the cast solution is gelated to form a gel layer (step 4). In the method of the present invention, since the cast solution is cast on the surface of the side of the hydrophilic PTFE porous membrane of the layered porous membrane in the step 3, the gel layer is not only formed on the surface (cast surface) of the hydrophilic PTFE porous membrane, but also formed in pores by filling thereinto in the step 4. Therefore, defects (microdefects such as pinholes) are less likely to occur and the success rate of the formation of the gel layer increases. In the step 4, the air-dried PTFE porous membrane is preferably thermally cross-linked at a temperature of about 120° C. for about 2 hours. In samples of Examples and Comparative Examples described hereinafter, any sample is thermally cross-linked.

Next, the same hydrophobic PTFE porous membrane as that of the layered porous membrane used in the step 3 is laid on the side of the gel layer of the surface of the hydrophilic PTFE porous membrane obtained in the step 4 to obtain a three-layered structure membrane of the present invention composed of a hydrophobic PTFE porous membrane/gel layer (impregnated gel membrane supported on the hydrophilic PTFE porous membrane)/hydrophobic PTFE porous membrane as schematically shown in FIG. 1 (step 5). In FIG. 1, the state where pores of the hydrophilic PTFE porous membrane 2 are filled with an impregnated gel membrane 1 is schematically shown in a linear form.

The membrane of the present invention thus produced through the steps 1 to 5 can realize membrane performances which can be applied to a $CO_2$ permeable membrane reactor, that is, a working temperature of 100° C. or higher, a $CO_2$ permeance of about $2 \times 10^{-5}$ mol/($m^2 \cdot s \cdot kPa$) (=60 GPU) or more and a $CO_2/H_2$ selectivity of about 90 to 100 or more, as described hereinafter.

By providing a three-layered structure in which the gel layer is sandwiched between the hydrophobic PTFE porous membranes, one hydrophobic PTFE porous membrane is used in the steps 3 and 4 for the purpose of supporting the hydrophilic PTFE porous membrane supporting the impregnated gel membrane and preventing permeation of the cast solution, while the other hydrophobic PTFE porous membrane is used for the purpose of protecting the impregnated gel membrane from the other side.

Furthermore, even when steam is condensed on the surface of the membrane of the hydrophobic porous membrane, since the PTFE porous membrane is hydrophobic to repel water, permeation of water into the impregnated gel layer is prevented. Therefore, it is possible to prevent the carbon dioxide carrier in the impregnated gel layer from being diluted with water, and also to prevent the diluted carbon dioxide carrier from flowing out of the impregnated gel layer.

Membrane performances of specific Examples will be described below.

First, the membrane composition of each sample of Examples in which a hydrophilic PTFE porous membrane is used as a porous membrane for supporting an impregnated gel membrane, and Comparative Example in which a hydrophobic PTFE porous membrane is used as a porous membrane will be described below.

Samples of Examples are produced by the method described above. The mixing ratio of PVA/PAA: $Cs_2CO_3$ is 30% by weight: 70% by weight in the sequence of description. A proportion of the weight of a carrier based on the total weight of a copolymer and a carrier is described as a "carrier concentration". In the case of the above example, the carrier concentration is 70% by weight (hereinafter referred to as "70% by weight").

Figure 3:
FIG. 3 is a sectional view schematically showing a structure of a comparative sample of a $CO_2$-facilitated transport membrane.

Each sample of Comparative Examples is produced by using a single-layered hydrophobic PTFE porous membrane in place of the layered porous membrane of a hydrophilic PTFE porous membrane and a hydrophobic PTFE porous membrane in the above method. Therefore, the sample of Comparative Examples is formed into a three-layered structure in which a PVA/PAA gel membrane 1 containing a carbon dioxide carrier is sandwiched between two hydrophobic porous membranes 3 and 4, as schematically shown in FIG. 3. The mixing ratio of PVA/PAA: $Cs_2CO_3$ is the same as in Examples.

The constitution and the test method for evaluating membrane performances of each sample of Examples and Comparative Examples will be described with reference to FIG. 4.

Figure 4:
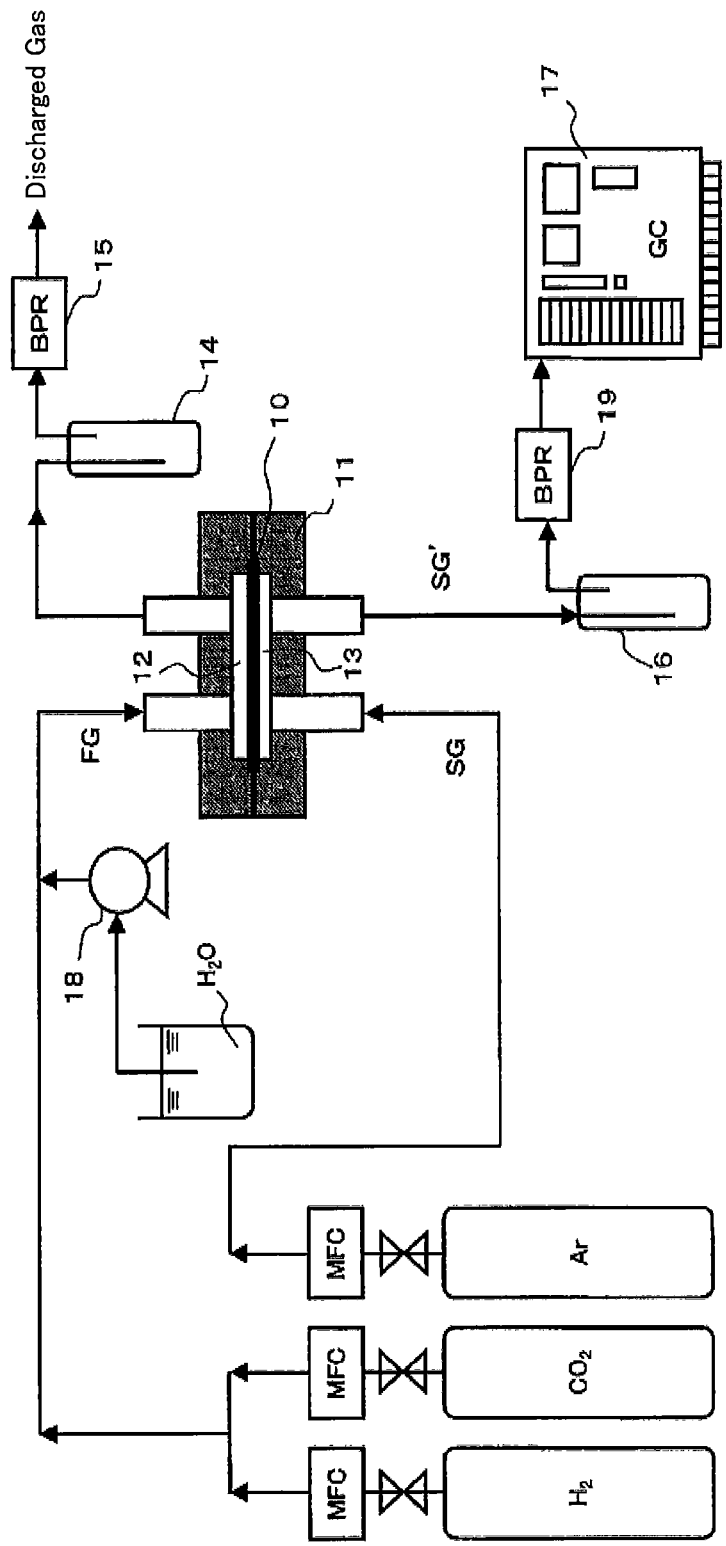
FIG. 4 is a block diagram of a test apparatus for evaluating membrane performances of a $CO_2$-facilitated transport membrane according to the present invention.

As shown in FIG. 4, each sample 10 is fixed between a feed side chamber 12 and a permeation side chamber 13 of a flow type gas permeation cell 11 (membrane area: 2.88 $cm^2$) made of stainless steel using a fluororubber gasket as a sealing material. A feed gas (mixed gas of $CO_2$, $H_2$ and $H_2O$) FG is fed to the feed side chamber 12 at a flow rate of $2.24 \times 10^{-2}$ mol/min and a sweep gas (Ar gas) SG is fed to the permeation side chamber 13 at a flow rate of $8.18 \times 10^{-4}$ mol/min. The pressure of the feed side chamber 12 is adjusted by a back pressure regulator 15 provided at the down stream side of a cold trap 14 along an exhaust passage of an exhaust gas. The pressure of the permeation side chamber 13 is atmospheric pressure. The gas composition after removing steam in a sweep gas SG' discharged from the permeation side chamber 13 by a cold strap 16 is quantitatively determined by a gas chromatograph 17, and permeance μmol/($m^2 \cdot s \cdot kPa$)] of $CO_2$ and $H_2$ are calculated from the gas composition and the flow rate of Ar in the sweep gas SG', and then $CO_2/H_2$ selectivity is calculated by the ratio. A back pressure regulator 19 is also provided between the cold trap 16 and the gas chromatograph 17, and the pressure of the permeation side chamber 13 is adjusted by the back pressure regulator.

In order to simulate the feed gas FG in a CO shift reactor, a mixed gas of $CO_2$, $H_2$ and $H_2O$ is adjusted to a mixing ratio (mol %) of $CO_2$: 5.0%, $H_2$: 45% and $H_2O$: 50%. Specifically, a mixed gas having the above mixing ratio is prepared by feeding water into mixed gas flow (flow rate at 25° C.: 200 cm³/min, 8.18×10⁻³ mol/min) of 10% $CO_2$ and 90% $H_2$ (mol %) using a metering pump 18 (flow rate: 0.256 cm³/min, 1.42×10⁻² mol/min) and vaporizing moisture with heating to 100° C. or higher, and the resultant mixed gas is fed to the feed side chamber 12.

The sweep gas SG is fed so as to maintain a permeation driving force by reducing a partial pressure of the permeation side chamber of a gas to be measured ($CO_2$, $H_2$) which permeates through a sample membrane, and a gas (Ar gas) different from the gas to be measured is used. Specifically, an Ar gas (flow rate at 25° C.: 20 cm³/min, 8.13×10⁻⁴ mol/min) is fed to the permeation side chamber 13.

In order to maintain working temperature of the sample membrane and the temperatures of the feed gas FG and the sweep gas SG at a constant temperature, the flow type gas permeation cell 11 to which the sample membrane is fixed, and a preheating coil (not shown) for heating the above gas are immersed in a constant-temperature bath set at a predetermined temperature.

Figures 5A, 5B, 5C:
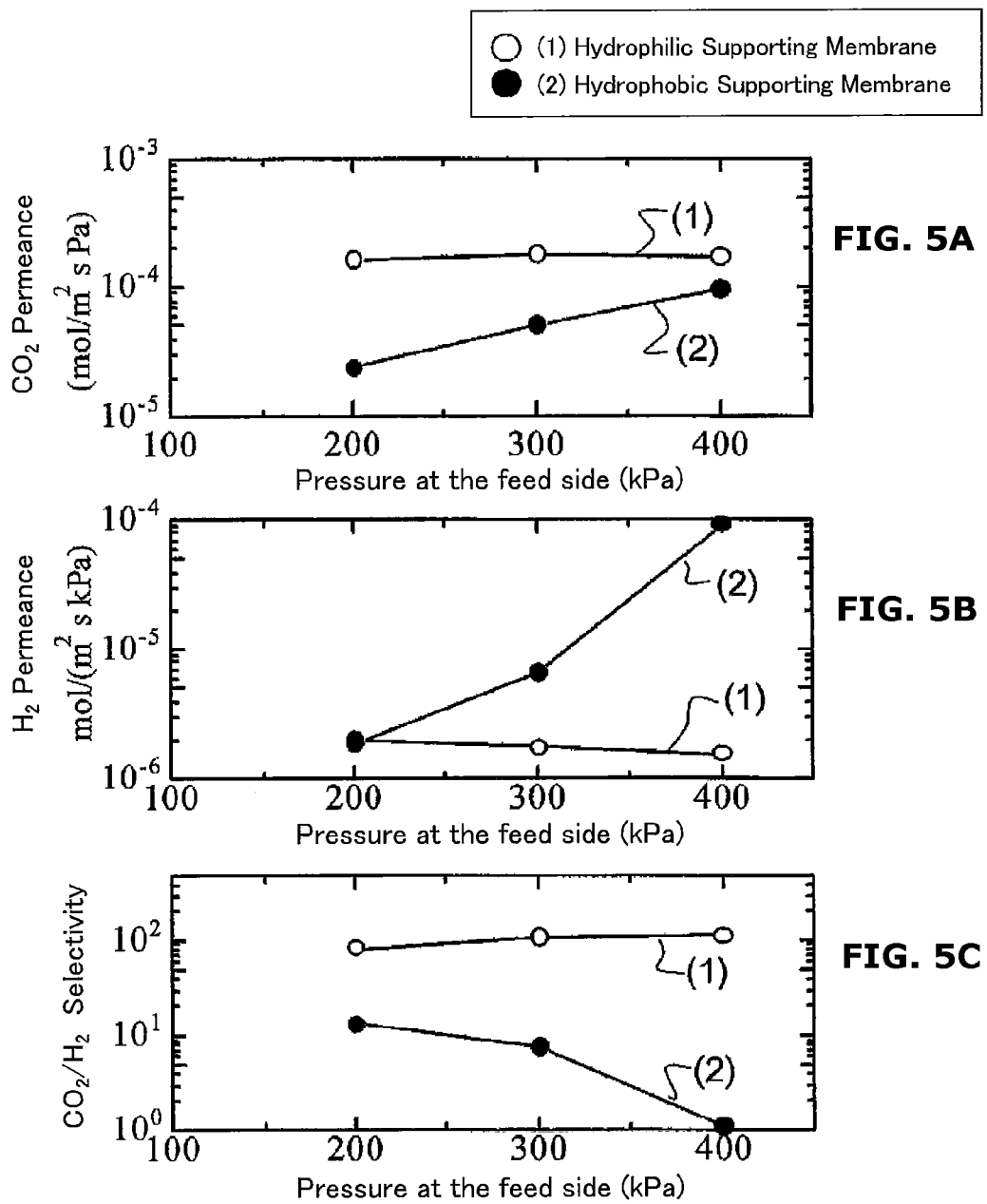
FIGS. 5A, 5B, 5C are graphs (1) showing the effect of improving $CO_2/H_2$ selectivity by use of a hydrophilic porous membrane in a $CO_2$-facilitated transport membrane according to the present invention.
Figures 6A, 6B, 6C:
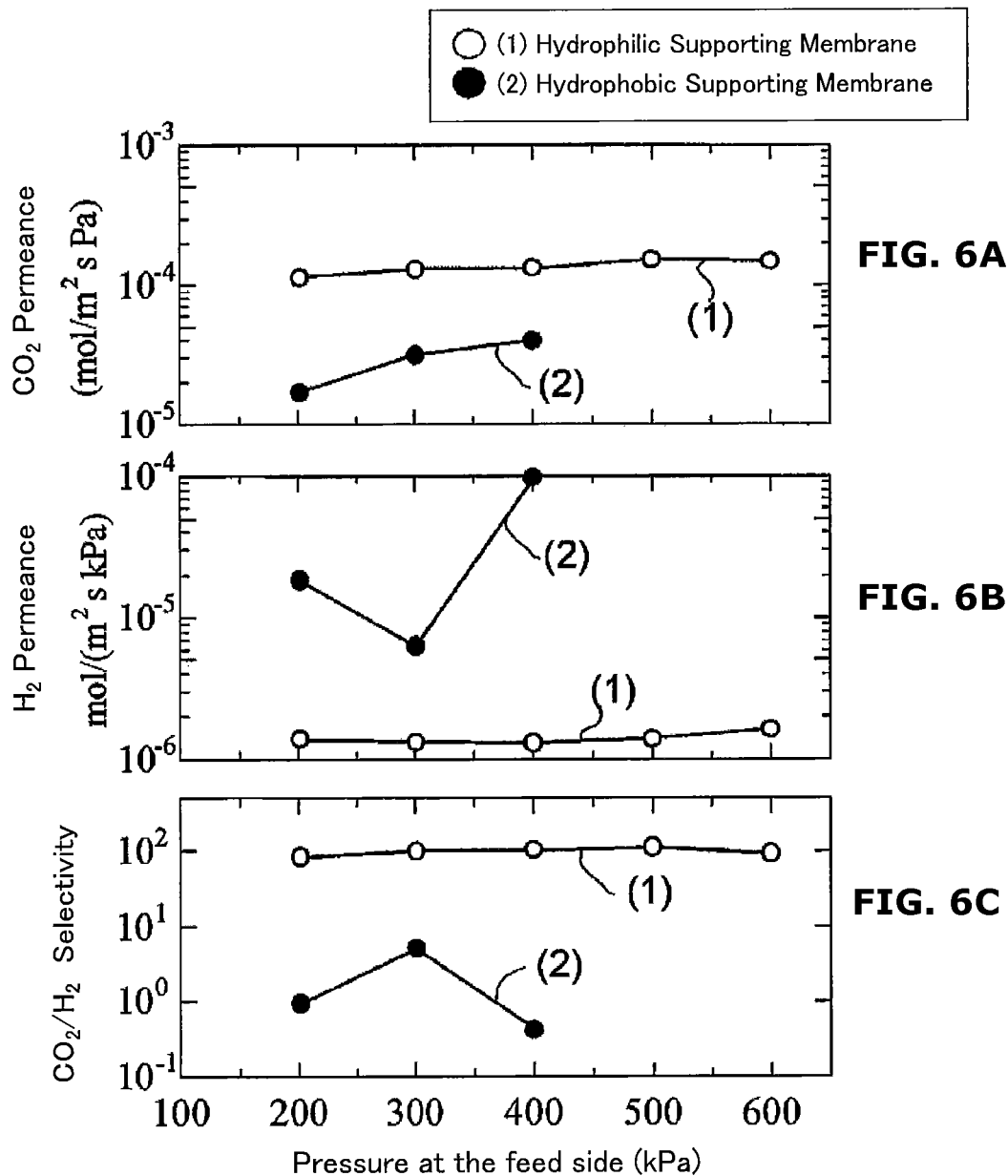
FIGS. 6A, 6B, 6C are graphs (2) showing the effect of improving $CO_2/H_2$ selectivity by use of a hydrophilic porous membrane in a $CO_2$-facilitated transport membrane according to the present invention.

Next, FIGS. 5A-5C and FIGS. 6A-6C show the results obtained by measuring $CO_2$ permeance $R_{CO2}$, $H_2$ permeance $RH_2$ and $CO_2/H_2$ selectivity of each sample of (1) Examples and (2) Comparative Examples in the state where the pressure of the feed gas FG (described as "the pressure at the feed side" on the graph, the same shall apply hereinafter) in the feed side chamber 12 is applied within a range from 200 kPa to 400 kPa. FIGS. 5A-5C show the results obtained by measuring at a temperature of 160° C., and FIGS. 6A-6C show the results obtained by measuring at a temperature of 180° C. As the value of the pressure at the feed side on the graph, the value of the pressure of the back pressure regulator 15 for adjusting the pressure of the feed side chamber 12 is adopted.

As is apparent from FIGS. 5A-5C and FIGS. 6A-6C, the $H_2$ permeance of the samples using the hydrophobic PTFE porous membrane of Comparative Examples is higher than that of the samples using the hydrophilic PTFE porous membrane of Examples in the entire pressure range, while $CO_2$ permeance and $CO_2/H_2$ selectivity of the samples of Examples are remarkably improved as compared with the samples of Comparative Examples. This reason is considered as follows. That is, when the cast solution is cast on the hydrophilic membrane, not only the gel layer is formed on the surface of the PTFE porous membrane, but also pores are filled with the gel layer, defects (microdefects such as pinholes) are less likely to occur and an increase in gas permeance, particularly $H_2$ permeance through the microdefects is suppressed. On the other hand, in the case of the hydrophobic membrane, since the cast solution does not permeate into pores of the membrane and is applied to the surface, defects are likely to occur and the $H_2$ permeance increases, resulting in deterioration of selectivity.

As is apparent from FIGS. 5A-5C and FIGS. 6A-6C, similar properties are exhibited even when the measuring temperature varies.

The $CO_2$-facilitated transport membranes disclosed in Patent Documents 1 and 2 do not satisfy any of a working temperature of 100° C. or higher, a $CO_2$ permeance of about 2×10⁻⁵ mol/(m²·s·kPa) or more and a $CO_2/H_2$ selectivity of about 90 to 100 or more, whereas, the samples of Examples shown in FIGS. 5A-5C and FIGS. 6A-6C nearly satisfy all requirements within the entire pressure range. The samples of Comparative Examples also exhibit a $CO_2$ permeance of about 2×10⁻⁵ mol/(m²·s·kPa) or more under a working temperature condition of 100° C. or higher. The samples of Comparative Examples suggest that $CO_2/H_2$ selectivity drastically decreases when the pressure at the feed side is 300 kPa or more.

Considering the results of FIGS. 5A-5C and FIGS. 6A-6C, as compared with the $CO_2$-facilitated transport membranes disclosed in Patent Documents 1 and 2, the membranes equipped with a PVA/PAA gel membrane containing $Cs_2CO_3$ of the present invention can improve $CO_2$ permeance under a high temperature condition of 100° C. or higher. The values of $CO_2$ permeance and $CO_2/H_2$ selectivity can be remarkably improved by using a hydrophilic porous membrane as a supporting membrane.

Similar to Examples, data are obtained using the membrane of the present invention, which has the constitution in which the impregnated gel membrane is supported by the hydrophilic PTFE.

Figure 7A:
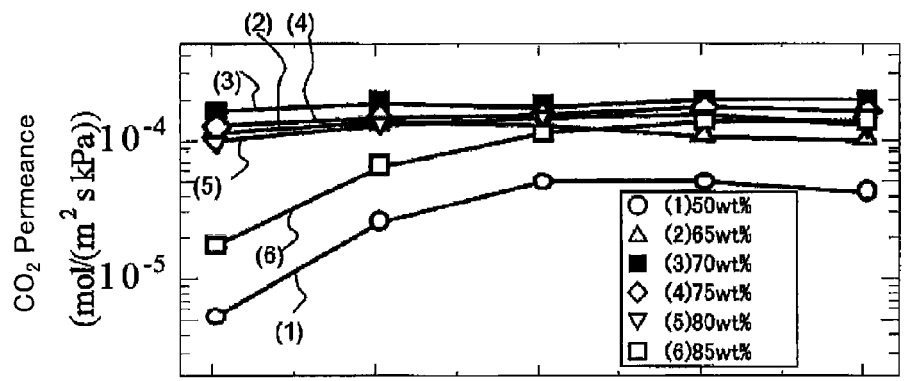
FIGS. 7A, 7B, 7C are graphs showing dependency of $CO_2$ permeance $R_{CO2}$ and $CO_2/H_2$ selectivity of a $CO_2$-facilitated transport membrane according to the present invention on the pressure of a feed gas and the carrier concentration.
Figure 7B:
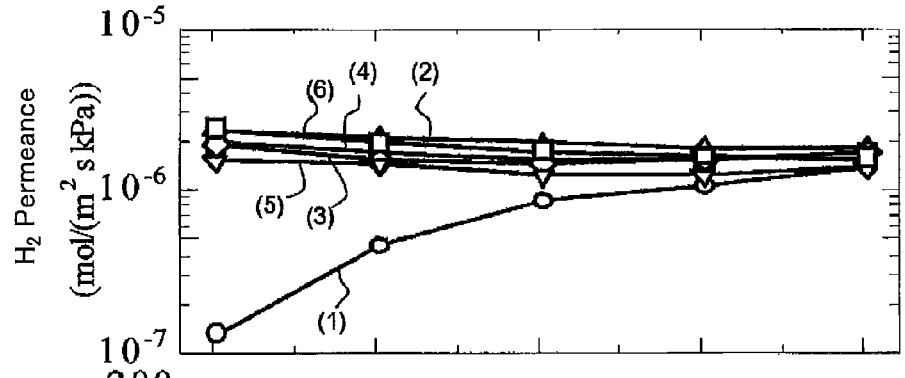
Figure 7C:
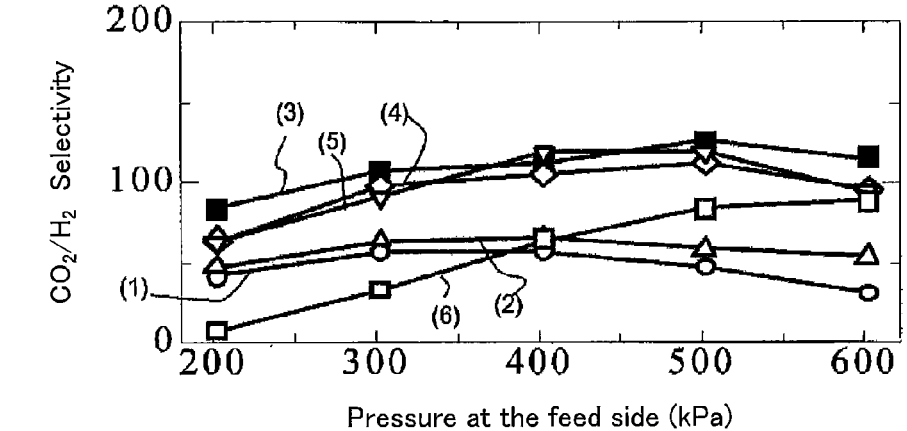

Next, FIGS. 7A-7C show the results obtained by measuring $CO_2$ permeance $R_{CO2}$, $H_2$ permeance $RH_2$ and $CO_2/H_2$ selectivity of each sample made by varying the carrier concentration within a range from 50 to 85% by weight under the same conditions as in FIGS. 5A-5C of the mixing ratio and the measurement temperature of the feed gas FG in the state where the pressure of the feed gas FG is within a range from 200 kPa to 600 kPa.

As is apparent from FIGS. 7A-7C, $CO_2$ permeance $R_{CO2}$ is maximized when the carrier concentration is 70% by weight at a measuring temperature of 160° C., and $CO_2$ permeance $R_{CO2}$ is maximized when the pressure of the feed gas FG is 500 kPa. It is also apparent that when the carrier concentration is 65% by weight or more and 80% by weight or less, and when the carrier concentration is 85% by weight and the pressure of the feed gas FG is 300 kPa or more, a high $CO_2$ permeance of 5.0×10⁻⁵ mol/(m²·s·kPa) or more is exhibited.

It is also apparent that, the $H_2$ permeance $R_{H2}$ usually tends to slightly decrease as the pressure of the feed gas FG entirely increased, with the exception of a carrier concentration of 50% by weight.

As is also apparent from FIGS. 7A-7C, in case the carrier concentration is 70% or more and 80% or less, a $CO_2/H_2$ selectivity of about 90 to 100 or more is exhibited when the pressure of the feed gas FG is within a range from 200 to 600 kPa.

From the results shown in FIGS. 7A-7C, according to the membrane of the present invention, a working temperature of 100° C. or higher (160° C.), a $CO_2$ permeance of about 2×10⁻⁵ mol/(m²·s·kPa) (=60 GPU) or more and a $CO_2/H_2$ selectivity of about 90 to 100 or more can be realized by adjusting the carrier concentration. Therefore, the membrane of the present invention can be applied to a $CO_2$ permeable membrane reactor.

Figures 8A, 8B:
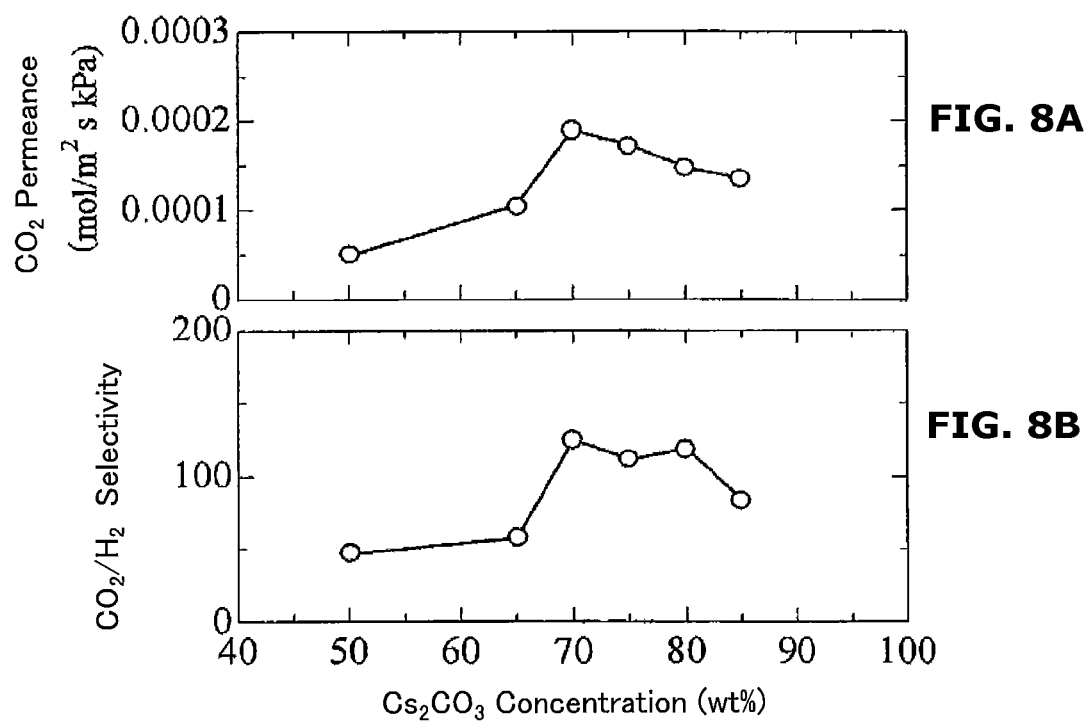
FIGS. 8A, 8B are graphs showing dependency of $CO_2$ permeance $R_{CO2}$ and $CO_2/H_2$ selectivity of a $CO_2$-facilitated transport membrane according to the present invention on the carrier concentration.

FIGS. 8A-8B illustrate graphs showing a relation between the carrier concentration and the $CO_2$ permeance $R_{CO2}$ and a relation between carrier concentration and the $CO_2/H_2$ selectivity when the feed gas pressure is constant (501.3 kPa). The mixing ratio of the feed gas FG and the measuring temperature are the same as those in the case of FIGS. 7A-7C.

As is apparent from FIGS. 8A-8B, both $CO_2$ permeance and $CO_2/H_2$ selectivity show the highest values when the carrier concentration is 70% by weight. In other words, as is apparent from FIGS. 8A-8B, both $CO_2$ permeance and $CO_2/H_2$ selectivity depend on the carrier concentration. Particularly, when the membrane of the present invention is used as the $CO_2$-facilitated transport membrane, the ability can be exhibited as much as possible by adjusting the carrier concentration to 70% by weight.

Figure 9A:
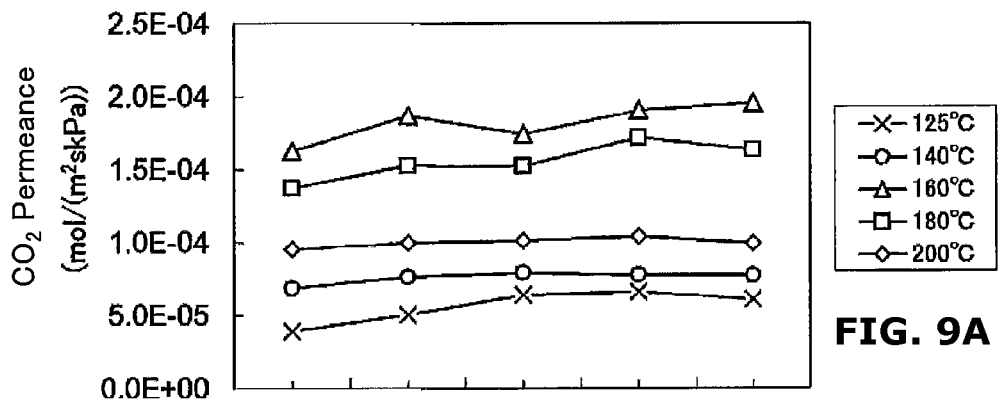
FIGS. 9A, 9B, 9C are graphs showing dependency of $CO_2$ permeance $R_{CO2}$ and $CO_2/H_2$ selectivity of a $CO_2$-facilitated transport membrane according to the present invention on the pressure of a feed gas and the working temperature.
Figure 9B:
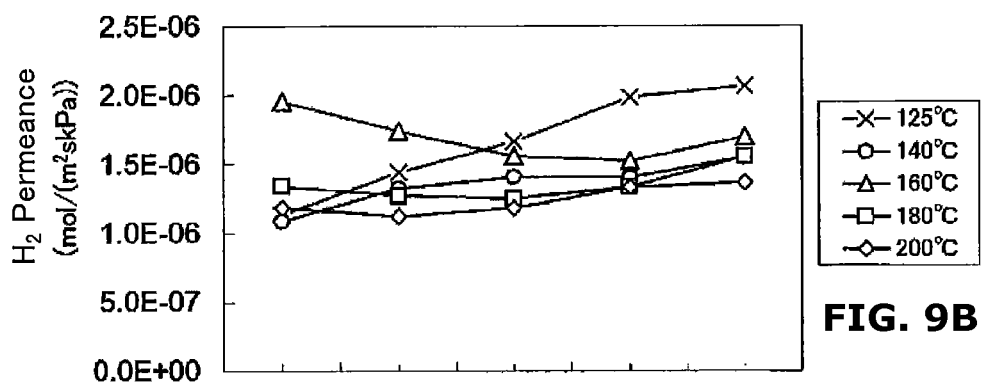
Figure 9C:
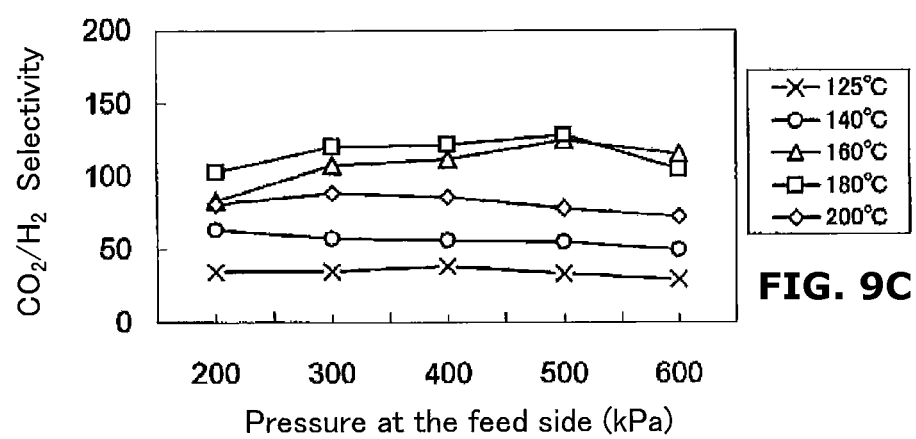

FIGS. 9A-9C show the results obtained by measuring $CO_2$ permeance $R_{CO2}$, $H_2$ permeance $R_{H2}$ and $CO_2/H_2$ selectivity under the conditions that the carrier concentration is adjusted to 70% by weight and the mixing ratio of the feed gas FG is the same as in FIGS. 7A-7C when the measuring temperature varies within a range of 125° C. or higher and 200° C. or lower in the state where the pressure of the feed gas FG in the feed side chamber 12 is within a range from 200 kPa to 600 kPa.

As is apparent from FIGS. 9A-9C, the $CO_2$ permeance $R_{CO2}$ becomes highest when the measuring temperature is 160° C. It is also apparent that the $CO_2/H_2$ selectivity is large when the measuring temperature is 160° C. and 180° C., and the $CO_2/H_2$ selectivity decreases even when the temperature becomes higher or lower than the above temperature. In other words, as is apparent from FIGS. 9A-9C, $CO_2$ permeance and $CO_2/H_2$ selectivity also depend on the measuring temperature. Particularly, when the membrane of the present invention is used as the $CO_2$-facilitated transport membrane, the ability can be exhibited as much as possible by using the membrane of the present invention under the temperature condition of 160° C. According to the membrane of the present invention, as compared with the conventional $CO_2$-facilitated transport membranes disclosed in Patent Documents 1 and 2, high $CO_2$ permeance and high $CO_2/H_2$ selectivity can be realized under sufficiently high temperature condition (125° C. to 200° C.) and in particular, satisfactory values can be realized at 140° C. to 180° C.

Since the membrane of the present invention exhibits $CO_2$ permeance $R_{CO2}$ of about $1.0 \times 10^{-4}$ mol/(m$^2$·s·kPa) even when the measuring temperature is 200° C., it is apparent that it exhibits a $CO_2$ permeance of about $2 \times 10^{-5}$ mol/(m$^2$·s·kPa) or more. It is also apparent that the value of $CO_2$ permeance does not change very much under constant temperature condition even when the pressure of the feed gas FG varies.

Furthermore, as is apparent from FIGS. 9A-9C, the $CO_2/H_2$ selectivity exhibits a value close to 100 under a pressure of 300 kPa under a high temperature condition of 200° C. In other words, it is apparent that the $CO_2$-facilitated transport membrane, which can be applied to the $CO_2$ permeable membrane reactor, can be realized even under a high temperature condition of about 200° C.

Figure 10A:
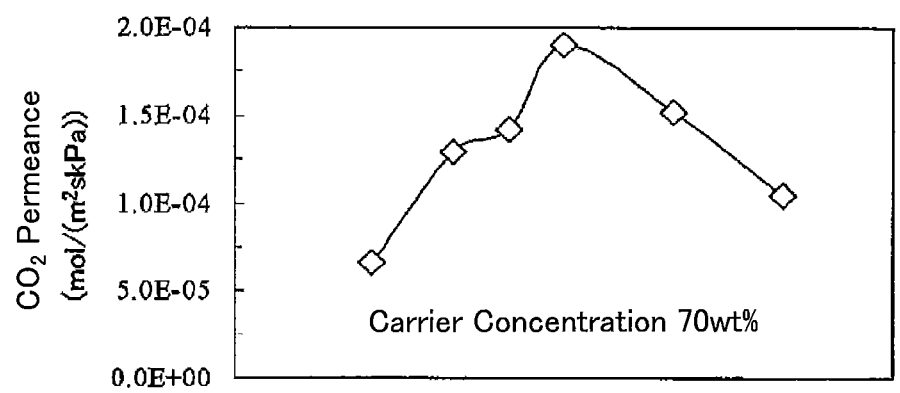
FIGS. 10A, 10B are graphs showing dependency of $CO_2$ permeance $R_{CO2}$ and $CO_2/H_2$ selectivity of a $CO_2$-facilitated transport membrane according to the present invention on the working temperature.
Figure 10B:
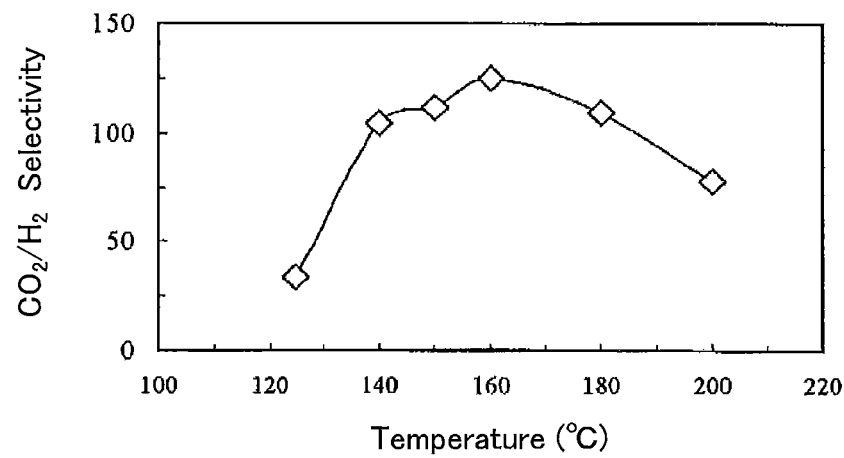

FIGS. 10A-10B show a relation between the measuring temperature and the $CO_2$ permeance $R_{CO2}$, and a relation between the measuring temperature and the $CO_2/H_2$ selectivity when the feed gas pressure is constant (501.3 kPa). The mixing ratio of the feed gas FG and the measuring temperature are the same as those in the case of FIGS. 9A-9C.

As is apparent from FIGS. 10A-10B, both $CO_2$ permeance and $CO_2/H_2$ selectivity exhibit highest values when the measuring temperature is 160° C. In other words, as is apparent from FIGS. 10A-10B, both $CO_2$ permeance and $CO_2/H_2$ selectivity depend on the measuring temperature. Particularly, when the membrane of the present invention is used as the $CO_2$-facilitated transport membrane, the ability can be exhibited as much as possible by using the membrane of the present invention under a temperature condition of 160° C.

Figure 11A:
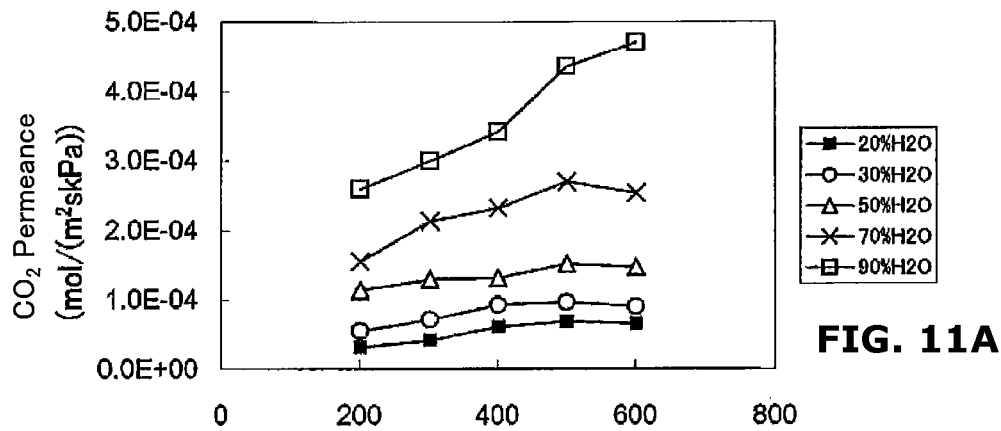
FIGS. 11A, 11B, 11C are graphs showing dependency of $CO_2$ permeance $R_{CO2}$ and $CO_2/H_2$ selectivity of a $CO_2$-facilitated transport membrane according to the present invention on the pressure of a feed gas and the steam mol %.
Figure 11B:
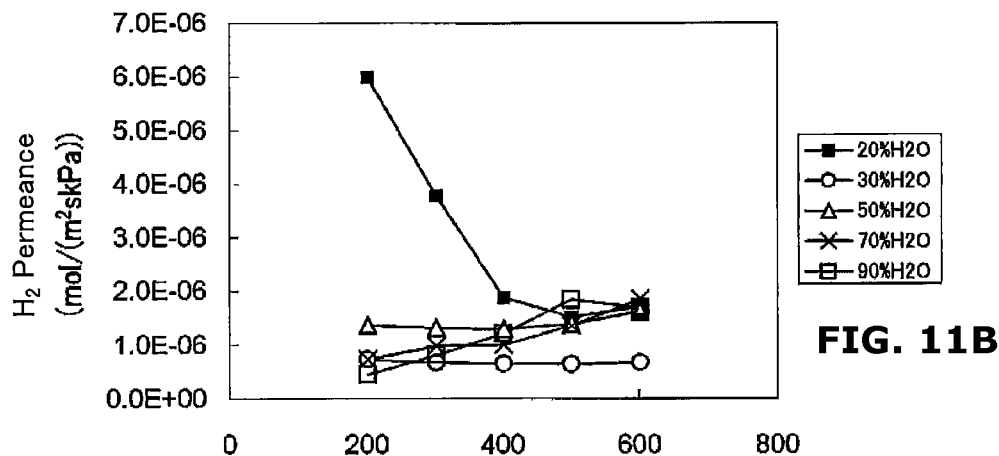
Figure 11C:
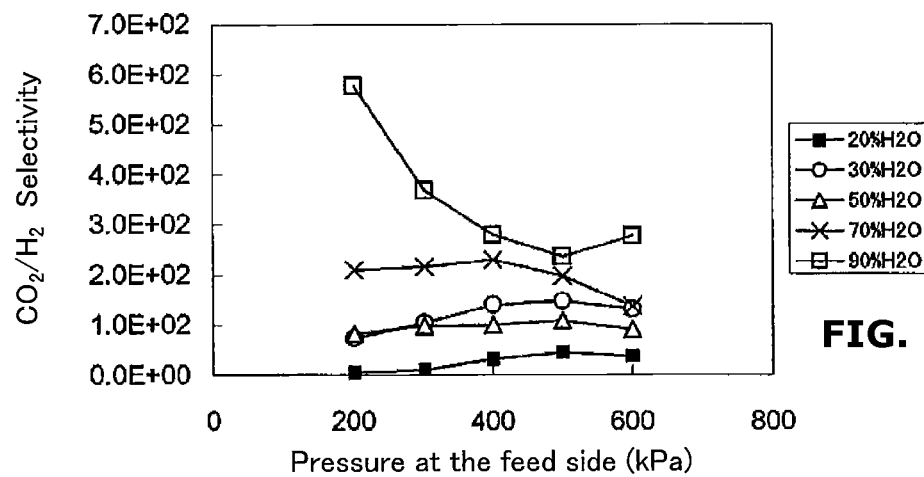

FIGS. 11A-11C show the results obtained by measuring $CO_2$ permeance $R_{CO2}$, $H_2$ permeance $RH_2$ and $CO_2/H_2$ selectivity of the samples made by adjusting the carrier concentration to 70% by weight when the mixing ratio of the feed gas FG and the measuring temperature are the same as those in FIGS. 6A-6C and the steam mol % varies to 20%, 30%, 50%, 70% and 90% in the state where the pressure of the feed gas FG is within a range from 200 kPa to 600 kPa. Specifically, the measurement is conducted by fixing $CO_2$ mol % of a mixture of $CO_2$, $H_2$ and $H_2O$ to 5% and varying mol % of $H_2$ and mol % of $H_2O$ (steam mol %) so as to adjust the total of mol % of $H_2$ and mol % of $H_2O$ to 95%.

As is apparent from FIGS. 11A-11C, the value of the $CO_2$ permeance increases as steam mol % increases, whereas, the value of the $CO_2$ permeance decreases as steam mol % decreases. Even when steam mol % is decreased to about 30%, the $CO_2$ permeance of about $1 \times 10^{-4}$ mol/(m$^2$·s·kPa) is exhibited under a pressure condition of the feed gas FG of 400 kPa.

The value of the $H_2$ permeance remarkably varies when steam mol % is 20%, but does not remarkably vary when steam mol % is the other value. It is apparent that the $CO_2/H_2$ selectivity entirely decreases as steam mol % decrease. Even when steam mol % is 30%, the $CO_2/H_2$ selectivity of about 100 is exhibited under the pressure condition of the feed gas FG of 400 kPa.

Therefore, as is apparent from the graphs shown in FIGS. 11A-11C, even under the condition where steam mol % is set to the low value such as 30% or less, the membrane of the present invention exhibits excellent performances and can realize a $CO_2$-facilitated transport membrane which can be applied to a $CO_2$ permeable membrane reactor.

Figure 12A:
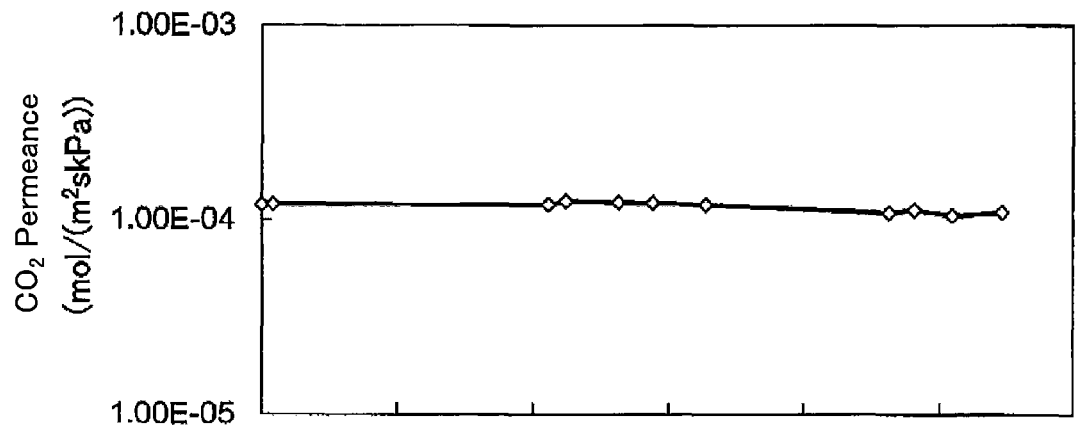
FIGS. 12A, 12B are graphs showing the change with time of $CO_2$ permeance $R_{CO2}$ and $CO_2/H_2$ selectivity of a $CO_2$-facilitated transport membrane according to the present invention.
Figure 12B:
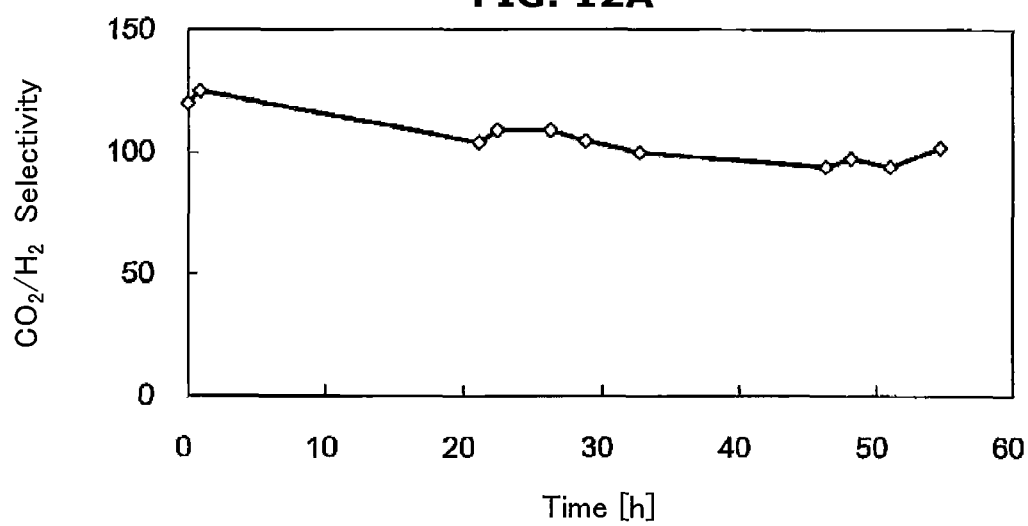

FIGS. 12A-12B are graphs showing long-term performances of the membrane of the present invention. The graphs show the change with time of the values of $CO_2$ permeance $R_{CO2}$ and $CO_2/H_2$ selectivity when the feed gas is adjusted to a mixing ratio (mol %) of $CO_2$: 5%, $H_2$: 45% and $H_2O$: 50% and the pressure of a feed gas is adjusted to 351.03 kPa, and the carrier concentration is adjusted to 70% by weight.

As is apparent from FIGS. 12A-12B, the value of the $CO_2$ permeance $R_{CO2}$ does not remarkably vary with time, and exhibits the value of about $1.6 \times 10^{-4}$ mol/(m$^2$·s·kPa). Further, the $CO_2/H_2$ selectivity does not remarkably vary with time, and exhibits a value of about 100. As described above, according to the membrane of the present invention, it is possible to realize a $CO_2$-facilitated transport membrane which does not cause drastic deterioration of performances with time, and also can be applied to a $CO_2$ permeable membrane reactor which exhibits excellent performances over a long period.

Table 1 described below shows a comparison of the values of $CO_2$ permeance, $H_2$ permeance and $CO_2/H_2$ selectivity between the membrane of the present invention and the membranes in which the membrane material is the same (PVA/PAA copolymer) and the materials used as a carbon dioxide carrier are various carbonates other than $Cs_2CO_3$. Table 1 shows data obtained by measuring the above values when carbonates of Na, K and Rb are used as the carbon dioxide carrier, in addition to the carbonate of Cs used in the membrane of the present invention. In any case, data are obtained by adjusting the feed gas pressure to 401.33 kPa, the measuring temperature to 160° C. and the feed gas to a mixing ratio (mol %) of $CO_2$: 5.0%, $H_2$: 45% and $H_2O$: 50%. Each membrane is produced by the same method as that of the membrane of the present invention.

TABLE 1

| Carbonate | Solubility in water [g/100 g-water (temperature)] | Concentration of carbonate in membrane [% by weight] | $CO_2$ permeance [mol/m$^2$ · s · kPa] | $H_2$ permeance [mol/m$^2$ · s · kPa] | $CO_2/H_2$ selectivity |
|---|---|---|---|---|---|
| $Na_2CO_3$ | 29.4 (25° C.) | 34.6 | $3.03 \times 10^{-6}$ | $6.89 \times 10^{-6}$ | 0.44 |
| $K_2CO_3$ | 112.1 (25° C.) | 49.7 | $1.00 \times 10^{-4}$ | $1.92 \times 10^{-6}$ | 52.5 |

TABLE 1-continued

| Carbonate | Solubility in water [g/100 g-water (temperature)] | Concentration of carbonate in membrane [% by weight] | $CO_2$ permeance [mol/m² · s · kPa] | $H_2$ permeance [mol/m² · s · kPa] | $CO_2/H_2$ selectivity |
|---|---|---|---|---|---|
| $Rb_2CO_3$ | 450 (20° C.) | 62.3 | $1.16 \times 10^{-4}$ | $2.75 \times 10^{-6}$ | 52.3 |
| $Rb_2CO_3$ | 450 (20° C.) | 70 | $1.21 \times 10^{-4}$ | $5.54 \times 10^{-7}$ | 219 |
| $Cs_2CO_3$ | 260.5 (15° C.) | 70 | $1.90 \times 10^{-4}$ | $1.53 \times 10^{-6}$ | 125 |

As is apparent from the results shown in Table 1, in the case of the $Na_2CO_3$ membrane, very low $CO_2$ permeance and high $H_2$ permeance are exhibited. This reason is considered as follows. That is, since $Na_2CO_3$ has low solubility in water (see Table 1), a crystal is produced when the cast membrane is cross-linked at 120° C. and thus a uniform membrane cannot be obtained. In the case of the $K_2CO_3$ membrane, although high $CO_2$ permeance is obtained, defects are likely to occur in the membrane, and thus $H_2$ permeance increases and high $CO_2/H_2$ selectivity cannot be obtained. In the case of the membrane containing $Rb^2CO_3$ and $Cs_2CO_3$ each having high solubility in water (see Table 1), satisfactory $CO_2$ permeance and $CO_2/H_2$ selectivity are obtained.

As described above, it became apparent that carbonates having high solubility in water efficiently functions as a $CO_2$ carrier even at high temperature and the membrane containing the same is less likely to cause defects and exhibits high $CO_2$ permeability and selectivity. The membrane of the present invention using $Cs_2CO_3$ as the carrier can realize a $CO_2$-facilitated transport membrane which exhibits high $CO_2$ permeance and high $CO_2/H_2$ selectivity.

Second Embodiment

The second embodiment of the present invention will be described below. Since the present embodiment differs from the first embodiment only in partial constitution of the membrane of the present invention and the method of the present invention, repetitive descriptions of the same constituent element are omitted.

The present embodiment differs from the first embodiment in the contents of the step of preparing a cast solution (step 1 described above). In the present embodiment, the following three steps are conducted as the step corresponding to the step 1 of the first embodiment (step of preparing a cast solution) and are referred to as Examples 1 to 3, respectively.

EXAMPLE 1

First, 20 g of water is added to 1 g of a PVA/PAA copolymer (for example, manufactured by Sumitomo Seika Chemicals Company, Limited under the tentative name of SS gel) and then a gel is dissolved by stirring at room temperature. To the solution, about 0.008 to 0.0343 g of glutaraldehyde is added, followed by stirring it under a temperature condition of 95° C. for 15 hours. To the solution, 2.33 g of $Cs_2CO_3$ is added, followed by stirring it at room temperature to obtain a cast solution. In Example 1, the cast solution is prepared by conducting a gel dissolution step, a glutaraldehyde addition step, a stirring step at a high temperature, a $Cs_2CO_3$ addition step and a stirring step at room temperature in this order.

EXAMPLE 2

First, 20 g of water is added to 1 g of a PVA/PAA copolymer and then a gel is dissolved by stirring it at room temperature. To the solution, 2.33 g of $Cs_2CO_3$ and 0.008 to 0.0343 g of glutaraldehyde are added and dissolved by stirring the solution at room temperature. Then, the solution is stirred under a temperature condition of 95° C. for 15 hours to obtain a cast solution. In Example 2, the cast solution is prepared by conducting a gel dissolution step, a glutaraldehyde and $Cs_2CO_3$ addition step, a stirring step at room temperature and a stirring step at a high temperature in this order.

EXAMPLE 3

First, 20 g of water is added to 1 g of a PVA/PAA copolymer and then a gel is dissolved by stirring it at room temperature. To the solution, 2.33 g of $Cs_2CO_3$ and 0.008 to 0.0343 g of glutaraldehyde are added and dissolved by stirring the solution at room temperature to obtain a cast solution. In Example 3, the cast solution is prepared by conducting a gel dissolution step, a glutaraldehyde and $Cs_2CO_3$ addition step and a stirring step at room temperature in this order.

In any of Examples 1 to 3, after preparing the cast solution, a $CO_2$-facilitated transport membrane is obtained by using the same method as in the steps (step 2 to 4) described in the first embodiment. After centrifugal separation is conduced so as to remove bubbles in the cast solution, the above cast solution is cast on the surface of the side of a hydrophilic PTFE porous membrane of a layered porous membrane, which is obtained by laying a hydrophobic PTFE porous membrane (thickness: 60 μm) and a hydrophilic PTFE porous membrane (thickness: 80 μm) one upon another on a glass plate, in a thickness of 500 μm using an applicator. Then, the cast solution is dried at room temperature for a day. A $CO_2$-facilitated transport membrane is obtained by maintaining under a high temperature condition of about 120° C. for 2 hours.

Membrane performances of the membranes of the present invention produced by the methods of Examples 1 to 3 will be described below. Regarding the membrane composition, the carrier concentration is adjusted to 70% by weight similarly to Examples of the first embodiment, and a test apparatus and a test method for evaluation of membrane performances are also the same as those in the first embodiment.

Figure 13A:
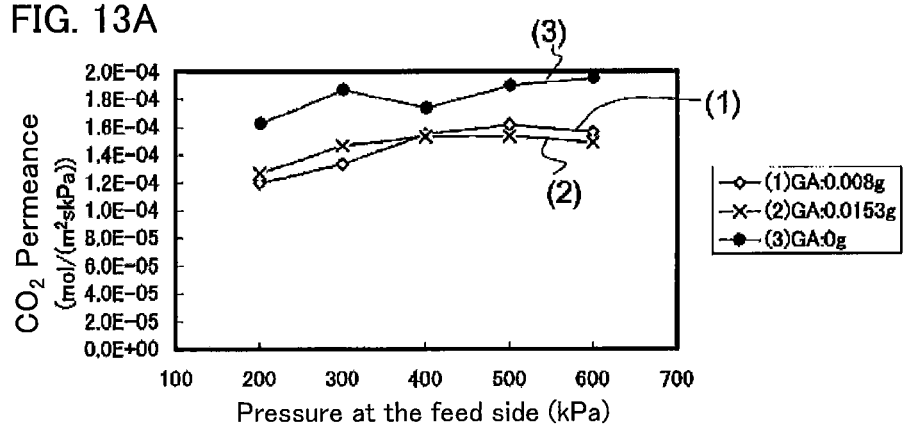
FIGS. 13A, 13B, 13C are graphs showing performances of a membrane of the present invention produced by a method of Example 1 of a second embodiment of the $CO_2$-facilitated transport membrane according to the present invention.
Figure 13B:
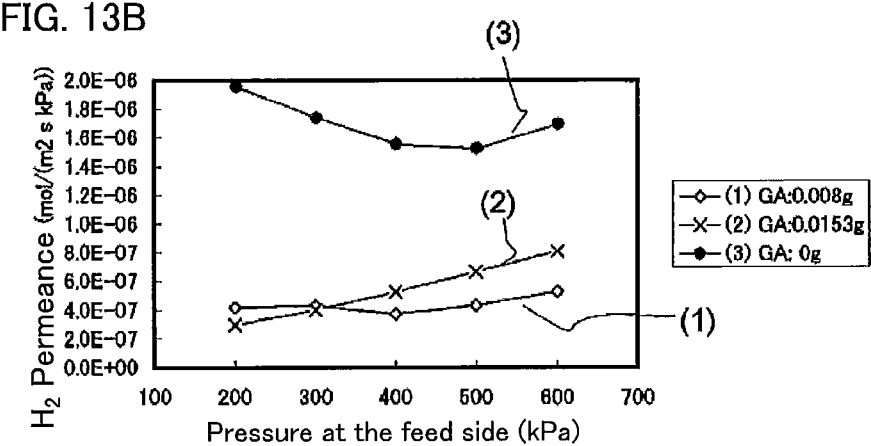
Figure 13C:
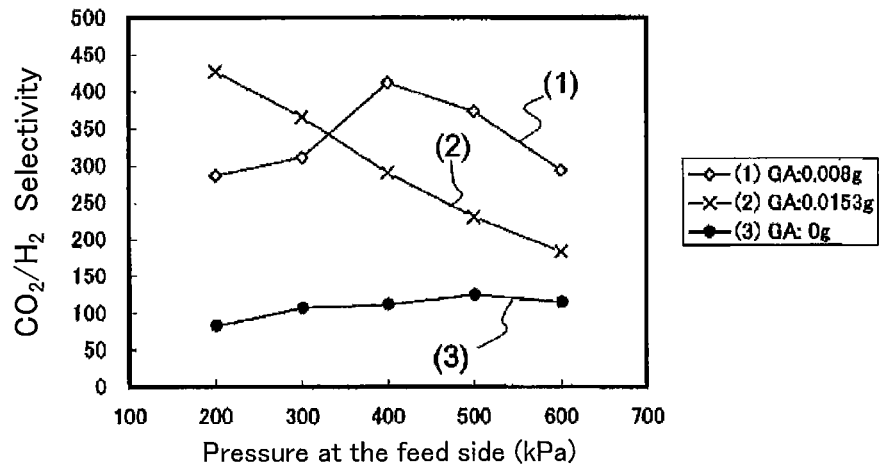

FIGS. 13A-13C show the results obtained by measuring (a) $CO_2$ permeance $R_{CO2}$, (b) $H_2$ permeance $RH_2$ and (c) $CO_2/H_2$ selectivity of the membranes of the present invention produced using the cast solution prepared by the method of Example 1 in the state where the pressure at the feed side is within a range from 200 kPa to 600 kPa. In FIGS. 13A-13C, data are measured by varying the amount of glutaraldehyde added in the cast solution. The test is conducted in three patterns by using (1) 0.008 g, (2) 0.0153 g, (3) 0 g (no addition) as the additive amount of glutaraldehyde. On the graph, glutaraldehyde is abbreviated to "GA" (the same shall apply to the graphs shown below).

Test conditions are as follows: the temperature condition: 160° C., feed gas FG: mixing ratio (mol %) of $CO_2$: 5.0%, $H_2$: 45% and $H_2O$: 50%, flow rate of feed gas FG: 360 cm³/min at 25° C. under 1 atm, pressure at the permeation side is 20 kPa lower than the pressure at the feed side, and flow rate of sweep gas SG: 40 cm³/min at 25° C. under 1 atm. These test conditions are the same in the respective Examples.

In FIG. 13A, when glutaraldehyde is added, the $CO_2$ permeance $R_{CO2}$ slightly decreases as compared with the case where glutaraldehyde is not added. However, as is apparent from FIG. 13B, since the $H_2$ permeance $RH_2$ drastically decreases when glutaraldehyde is added, the $CO_2/H_2$ selectivity is remarkably increased by adding glutaraldehyde as compared with the case where glutaraldehyde is not added, as shown in FIG. 13C. The reason for this is considered as follows. That is, since a cross-linking structure is formed by adding glutaraldehyde, defects of the membrane are less likely to occur and thus the $H_2$ permeance is remarkably decreased. As is apparent from FIG. 13B and FIG. 13C, when 0.008 g of glutaraldehyde is added, the $H_2$ permeance is low and the $CO_2/H_2$ selectivity is high as compared with the case where 0.0153 g of glutaraldehyde is added. As a result, it is suggested that selectivity does not become higher as the additive amount of glutaraldehyde increases, and a proper additive amount capable of realizing high selectivity exists according to the test conditions.

Figure 14A:
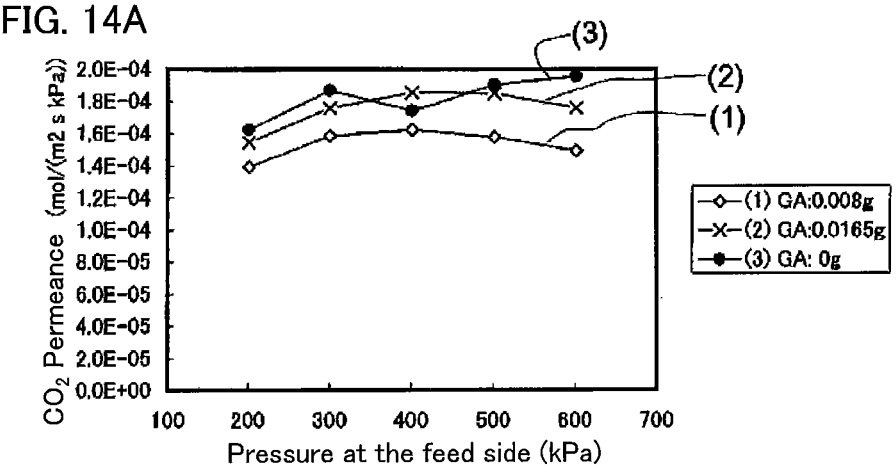
FIGS. 14A, 14B, 14C are graphs showing performances of a membrane of the present invention produced by a method of Example 2 of a second embodiment of the $CO_2$-facilitated transport membrane according to the present invention.
Figure 14B:
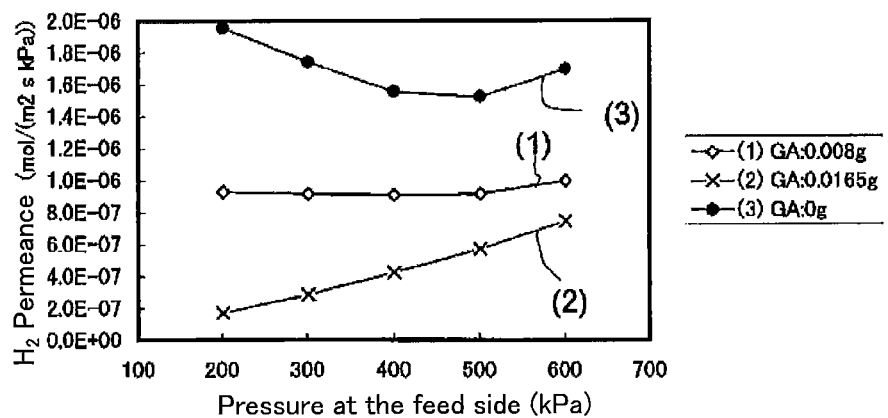
Figure 14C:
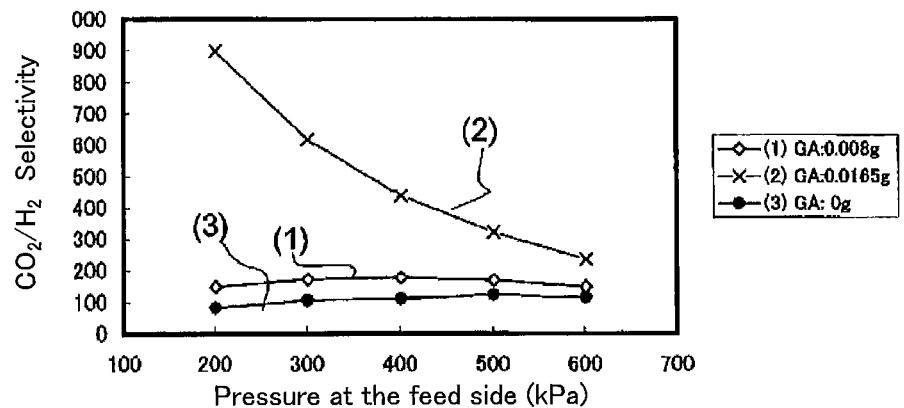

FIGS. 14A-14C show the results obtained by measuring (a) $CO_2$ permeance $R_{CO2}$, (b) $H_2$ permeance $R_{H2}$ and (c) $CO_2/H_2$ selectivity of the membranes of the present invention produced using the cast solution prepared by the method of Example 2 in the state where the pressure at the feed side is within a range from 200 kPa to 600 kPa. In FIGS. 14A-14C, data are obtained by varying the amount of glutaraldehyde added in the cast solution. The test is conducted in three patterns by using (1) 0.008 g, (2) 0.0165 g, (3) 0 g (no addition) as the additive amount of glutaraldehyde. Other test conditions are the same as those in Example 1.

In FIG. 14A, when glutaraldehyde is added, the $CO_2$ permeance $R_{CO2}$ slightly decreases as compared with the case where glutaraldehyde is not added, similar to FIG. 13A. As is apparent from FIG. 14B, since the $H_2$ permeance $R_{H2}$ drastically decreases when glutaraldehyde is added, similar to FIG. 13B, the $CO_2/H_2$ selectivity is remarkably increased by adding glutaraldehyde as compared with the case where glutaraldehyde is not added as shown in FIG. 14C. The reason for this is considered to be the same reason as in the case of Example 1. That is, since a cross-linking structure is formed by adding glutaraldehyde, defects of the membrane are less likely to occur and thus the $H_2$ permeance is remarkably decreased. As is apparent from FIG. 14B and FIG. 14C, when 0.008 g of glutaraldehyde is added, the $H_2$ permeance is low and the $CO_2/H_2$ selectivity is high as compared with the case where 0.0165 g of glutaraldehyde is added. As a result, it is suggested that selectivity does not become higher as the additive amount of glutaraldehyde increases, and a proper additive amount capable of realizing high selectivity exists according to the test conditions. In FIG. 14C, in the range where the gas pressure at the feed side is high, the difference in selectivity due to the amount of glutaraldehyde added decreases.

Figure 15A:
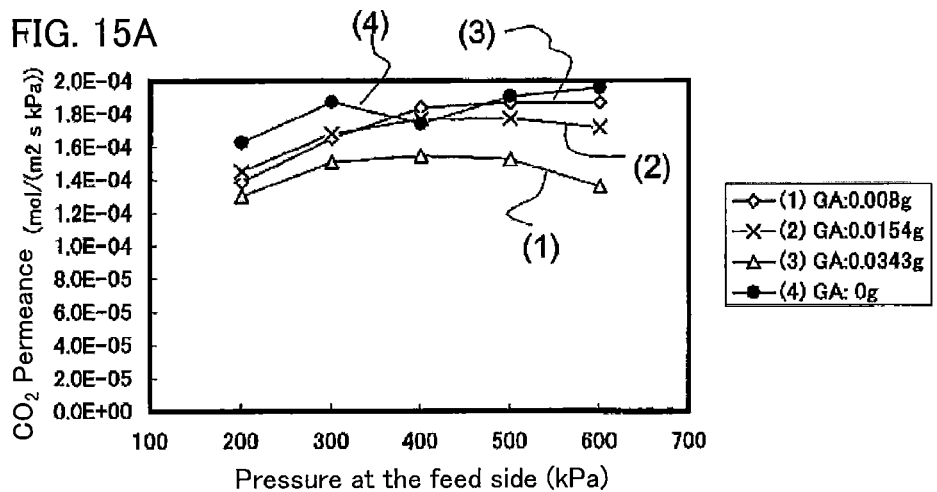
FIGS. 15A, 15B, 15C are graphs showing performances of a membrane of the present invention produced by a method of Example 3 of a second embodiment of the $CO_2$-facilitated transport membrane according to the present invention.
Figure 15B:
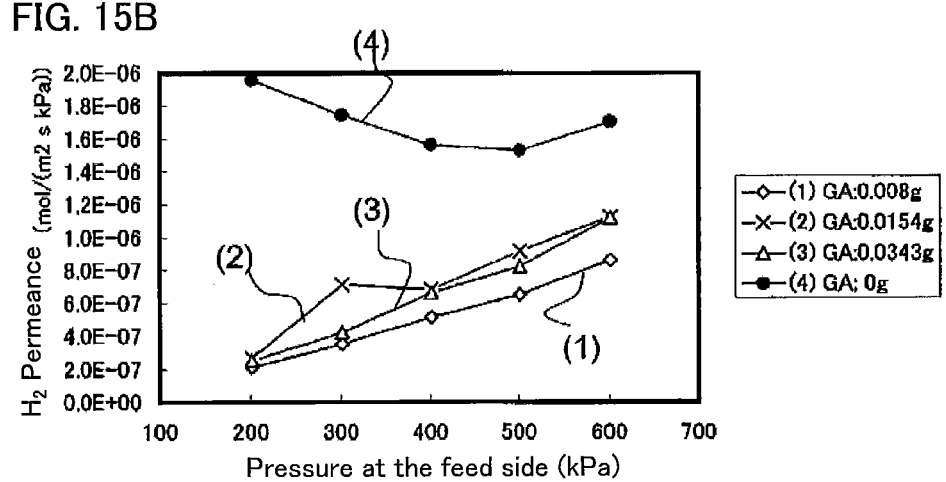
Figure 15C:
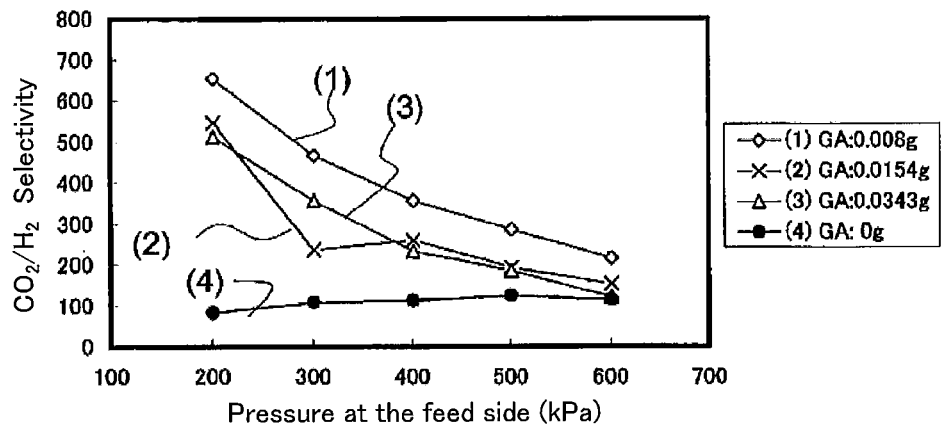

FIGS. 15A-15C show the results obtained by measuring (a) $CO_2$ permeance $R_{CO2}$, (b) $H_2$ permeance $RH_2$ and (c) $CO_2/H_2$ selectivity of the membranes of the present invention produced using the cast solution prepared by the method of Example 3 in the state where the pressure at the feed side is within a range from 200 kPa to 600 kPa. In FIGS. 14A-14C, data are measured by varying the amount of glutaraldehyde added in the cast solution. The test is conducted in four patterns by using (1) 0.008 g, (2) 0.0154 g, (3) 0.0343 g and (4) 0 g (no addition) as the additive amount of glutaraldehyde. Other test conditions are the same as those in Example 1.

In FIG. 15A, when glutaraldehyde is added, the $CO_2$ permeance $R_{CO2}$ slightly decreases as compared with the case where glutaraldehyde is not added, similar to FIG. 13A. As is apparent from FIG. 15B, since the $H_2$ permeance $RH_2$ drastically decreases when glutaraldehyde is added, similar to FIG. 13B, the $CO_2/H_2$ selectivity is remarkably increased by adding glutaraldehyde as compared with the case where glutaraldehyde is not added as shown in FIG. 15C. The reason for this is considered to be the same reason as in the case of Example 1. That is, since a cross-linking structure is formed by adding glutaraldehyde, defects of the membrane are less likely to occur and thus the $H_2$ permeance is remarkably decreased. As is apparent from FIG. 15B and FIG. 15C, when 0.008 g of glutaraldehyde is added, the $H_2$ permeance is low and the $CO_2/H_2$ selectivity is high as compared with the case where 0.0154 g of glutaraldehyde is added and the case where 0.0343 g of glutaraldehyde is added. As a result, it is suggested that selectivity does not become higher even if the additive amount of glutaraldehyde increases, and a proper additive amount capable of realizing high selectivity exists according to the test conditions.

Further, in FIG. 15C, in the range where the gas pressure at the feed side is high, the difference in selectivity due to the amount of glutaraldehyde added decreases.

Referring to each graph of FIG. 13A to FIG. 15C, by cross-linking the gel membrane with glutaraldehyde, it becomes possible to remarkably reduce the $H_2$ permeability without so much deterioration of $CO_2$ permeability as compared with the case where glutaraldehyde is not added, thus making it possible to realize a facilitated transport membrane which exhibits high $CO_2/H_2$ selectivity. Particularly, when about 0.008 to 0.015 g of glutaraldehyde is added to 1 g of the PVA/PAA copolymer (hereinafter, such a range is referred to "satisfactory range"), the $CO_2/H_2$ selectivity is remarkably improved.

In Examples 1 to 3, there is not a remarkable difference in membrane performances. That is, even when the membrane is produced by any method, the effect of improving the $CO_2/H_2$ selectivity by the addition of glutaraldehyde can be realized. Particularly in Examples 2 and 3, even when the gel membrane is cross-linked with glutaraldehyde, a decrease in $CO_2$ permeance is suppressed. In Example 1, even when the pressure at the feed side increases, an increase in $H_2$ permeance is limited.

Figure 16A:
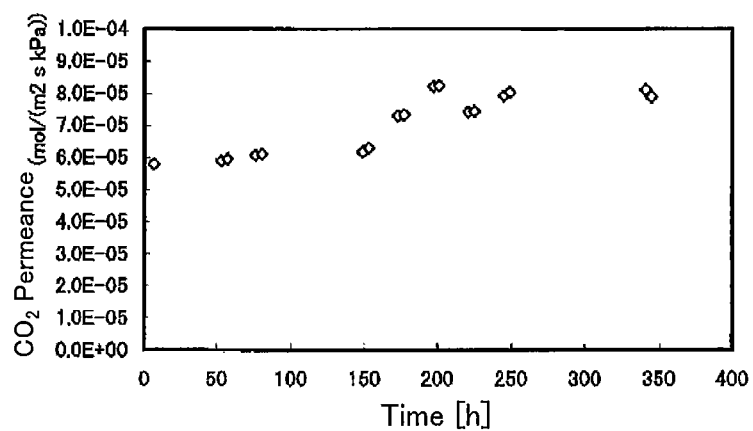
FIGS. 16A, 16B, 16C are graphs showing the change with time of performances of a membrane of the present invention produced by a method of Example 1 of a second embodiment of the $CO_2$-facilitated transport membrane according to the present invention.
Figure 16B:
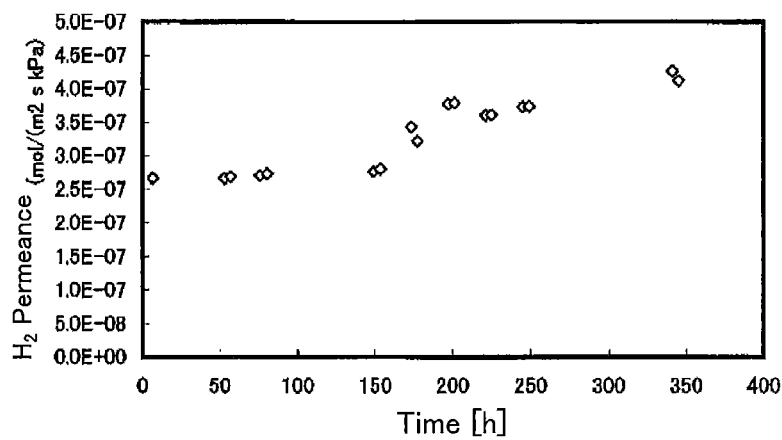
Figure 16C:
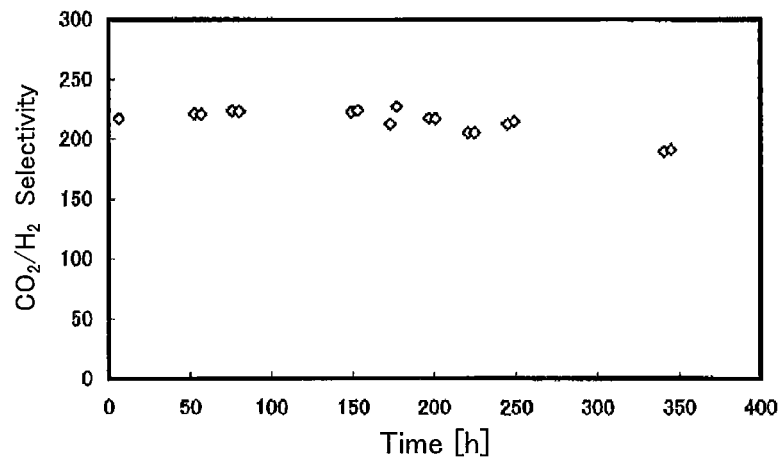

FIGS. 16A-16C are graphs showing long-term performances when glutaraldehyde is added. Specifically, the graph shows the change with time of (a) $CO_2$ permeance $R_{CO2}$, (b) $H_2$ permeance $RH_2$ and (c) $CO_2/H_2$ selectivity when a long-term test is conducted using the membranes (additive amount of glutaraldehyde: 0.0339 g) produced by the method of Example 1. The pressure at the feed side is adjusted to 401.3 kPa, and other test conditions are the same as those in FIG. 13A to FIG. 15C.

The test method is as follows. The membrane of the present invention is set to a permeation cell at about 10 AM and the temperature is raised to 160° C., and then a feed gas and a sweep gas are fed, followed by a permeation test. The test is continued under the same conditions until around 8 PM. At around 8 PM, the feed gas is stopped and the temperature is lowered to room temperature. At around 10 AM in the next morning, the similar test is conducted using the same membrane without decomposing the permeation cell. Such a test is repeatedly continued for 2 weeks. The results are shown in FIG. 16A to FIG. 16C.

Regarding test data of FIGS. 16A-16C, since the amount of glutaraldehyde added is slightly more than the satisfactory range, the $CO_2$ permeance shows a small value as compared with the values of FIG. 13A to FIG. 15C. However, the $H_2$ permeance shows a drastically small value as compared with the case where glutaraldehyde is not added even after a lapse of time, and also $CO_2/H_2$ selectivity maintains a high value of 200 or more. Like the present evaluation method, when evaluation with a lapse of time is conducted by repeating start-up and shut-down, since variation in temperature (room temperature to 160° C.) and variation in pressure (normal pressure to 6 atm) are repeatedly applied to the membrane, the load on the membrane is increased compared to continuing the test at the same temperature under the same pressure where long-term performances are evaluated. In FIGS. 16A-16C, since membrane performances are stable for about 2 weeks even by the present evaluation method for repeating start-up and shut-down, it can be said that stability of the membrane can be remarkably improved by adding glutaraldehyde.

Although glutaraldehyde is employed as the material to be added in the present embodiment, since the addition step of the material is conducted in order to form a cross-linking structure in the membrane, the material is not limited to glutaraldehyde as long as it is the material capable of forming the cross-linking structure. When the cross-linking structure is formed by an aldehyde group, for example, formaldehyde can also be used. Even when the material used as a carbon dioxide carrier is a material other than $Cs_2CO_3$ (for example, $Rb_2CO_3$), membrane performances can be further improved by similarly introducing an additive to form a cross-linking structure.

Third Embodiment

The third embodiment of the present invention will be described below. The present embodiment differs from the first and second embodiments in the shape of the membrane of the present invention.

In the above first and second embodiments, a description is made on the assumption of a facilitated transport membrane having a flat plate type structure as shown in FIG. 1. In contrast, in the present embodiment, a description is made on the assumption of a facilitated transport membrane having a cylindrical shape as shown in FIGS. 17A-17B.

Figure 17A:
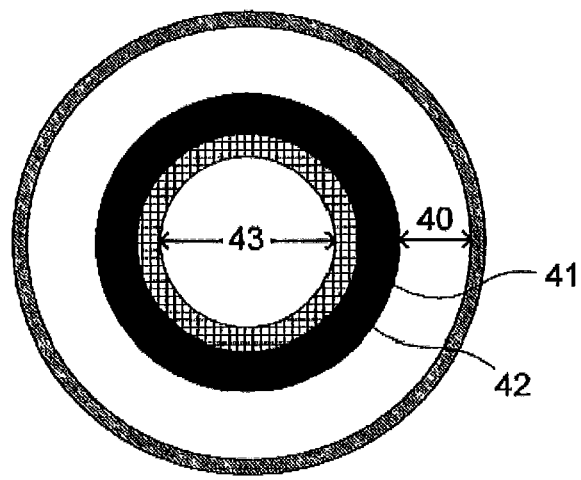
FIGS. 17A, 17B are sectional views schematically showing a structure of a $CO_2$-facilitated transport membrane of a third embodiment according to the present invention.
Figure 17B:
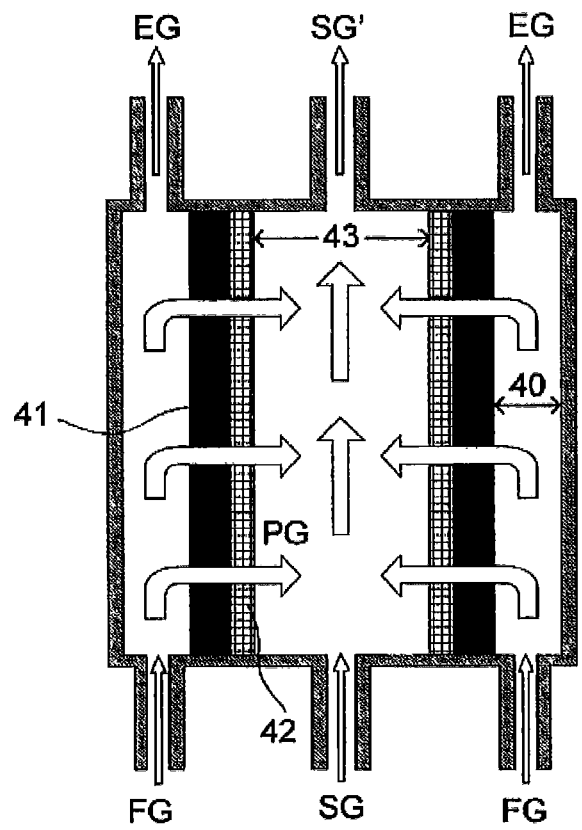
Figure 18A:
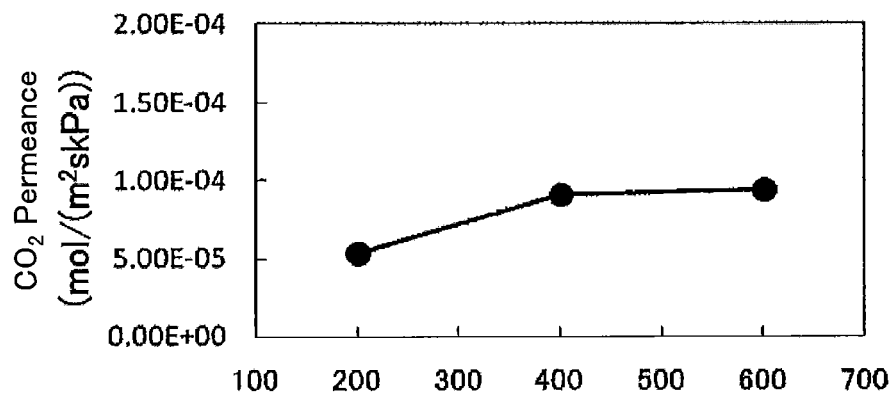
FIGS. 18A, 18B, 18C are graphs showing dependency of $CO_2$ permeance, $H_2$ permeance and $CO_2/H_2$ selectivity of a $CO_2$-facilitated transport membrane of a third embodiment according to the present invention on the temperature of a feed gas and the pressure.
Figure 18B:
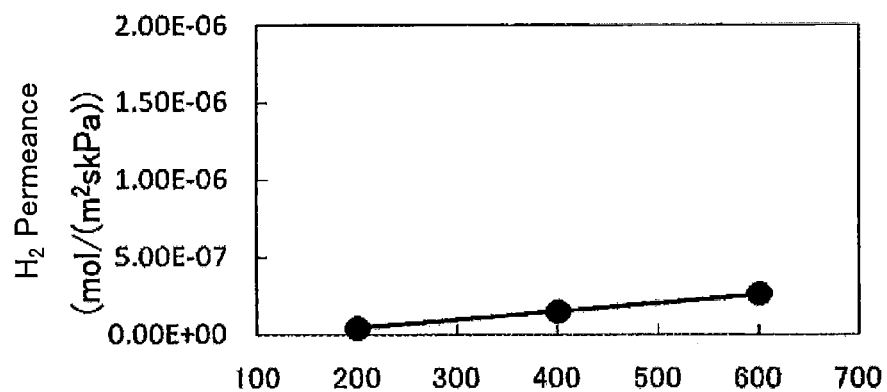
Figure 18C:
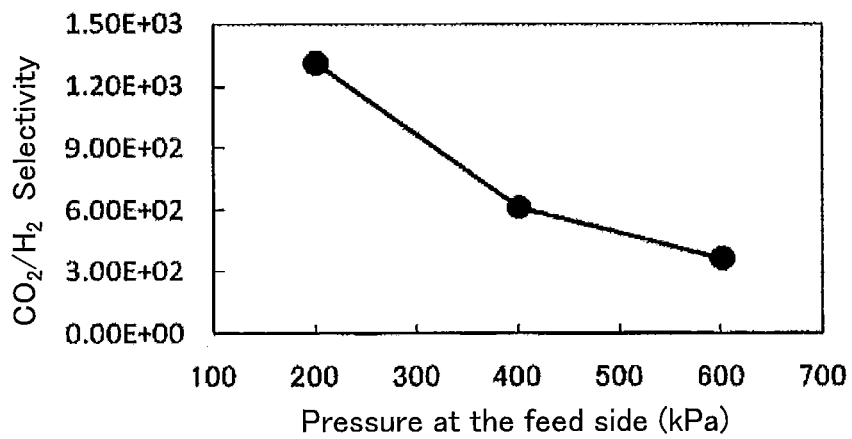

FIGS. 17A-17B are schematic views showing a structure of a facilitated transport membrane of the present embodiment. FIGS. 18A-18C are graphs showing $CO_2$ permeance, $H_2$ permeance and $CO_2/H_2$ selectivity when a facilitated transport membrane having a cylindrical shape is used.

FIG. 17A is a sectional view cut in parallel to a horizontal plane, and FIG. 17B is a sectional view cut in a direction vertical to a horizontal plane. The facilitated transport membrane shown in FIGS. 17A-17B has a structure in which a gel membrane 41 containing a carrier is supported on an outer periphery of a cylindrical hydrophilic supporting membrane made of ceramics 42. In the present embodiment, the same gel membrane 41 made from a cast solution as in the first embodiment is used. That is, $Cs_2CO_3$ is used as a carrier and is thermally cross-linked. As ceramics, for example, alumina can be used.

As shown in FIGS. 17A-17B, a space 40 is provided between the gel membrane 41 and an outer frame, and also a space 43 is provided inside the supporting membrane made of ceramics 42.

In the evaluation of membrane performances, the same feed gas FG as in the above embodiment is allowed to flow into a space 40, while an inert sweep gas SG is allowed to flow into a space 43. A portion of the feed gas FG allowed to flow into the space 40 permeates through a gel membrane 41 containing a carrier (and supporting membrane 42) and is allowed to flow into the space 43 as a permeate gas PG. An inert sweep gas SG for discharging this permeate gas PG out of the system is allowed to flow into the space 43, and an exit gas SG' as a mixture of this sweep gas SG and a permeate gas PG is fed into a cold trap 16 shown in FIG. 4. The method for calculating the permeance and selectivity is the same as in the first embodiment.

FIGS. 18A-18C are graphs based on data obtained when the cylindrical facilitated transport membrane shown in FIGS. 17A-17B is used as a facilitated transport membrane and the measuring method, carrier concentration and feed gas pressure are the same as those in FIGS. 9A-9C, and the measuring temperature is set to 160° C. Similar to FIGS. 9A-9C, both $CO_2$ permeance and $CO_2/H_2$ selectivity exhibit high values and it is apparent that the cylinder type facilitated transport membrane having a structure shown in FIGS. 17A-17B exerts the same effect as that of the flat plate type one shown in FIG. 1.

Figure 19A:
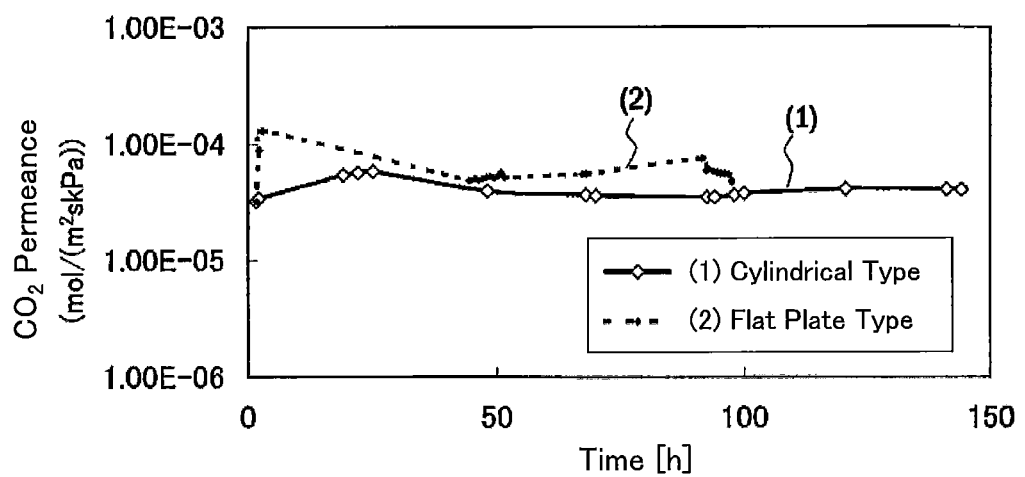
FIGS. 19A, 19B are graphs showing a comparison of the change with time of $CO_2$ permeance $R_{CO2}$ and $CO_2/H_2$ selectivity between cylinder type and flat plate type facilitated transport membranes.
Figure 19B:
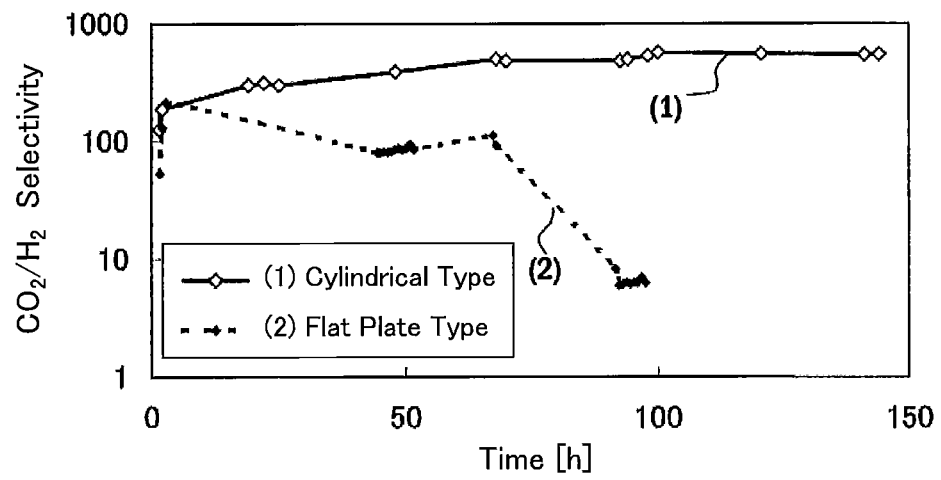
Figure 20:
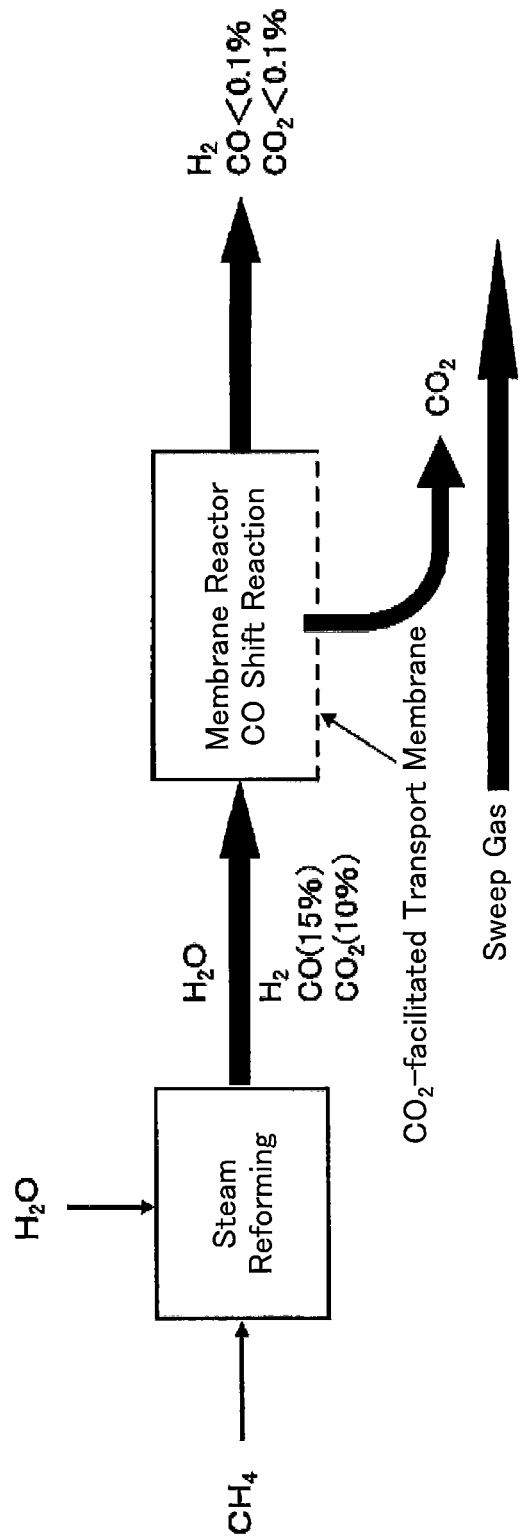
FIG. 20 is a diagram showing flow of various gases in a CO shift reactor equipped with a $CO_2$-facilitated transport membrane.
Figure 21A:
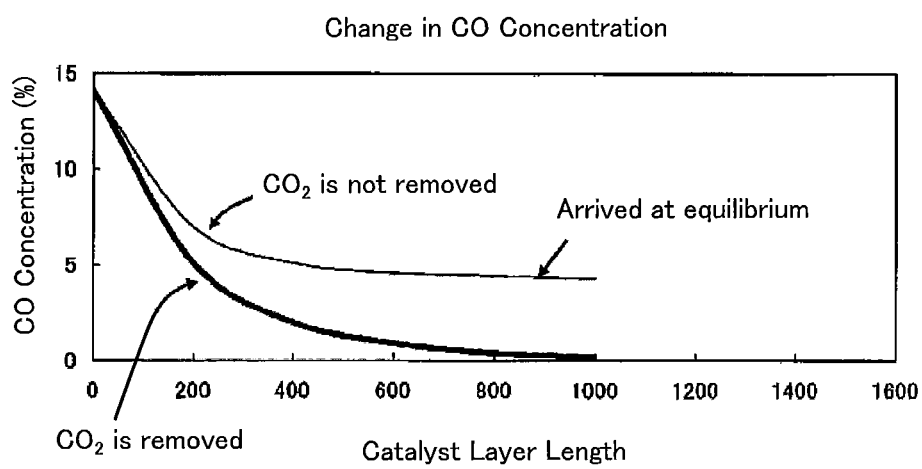
FIGS. 21A, 21B are graphs showing a comparison of the change in each concentration of carbon monoxide and carbon dioxide along the catalyst layer length of a CO shift reactor between whether the CO shift reactor is equipped with a $CO_2$-facilitated transport membrane or not.
Figure 21B:
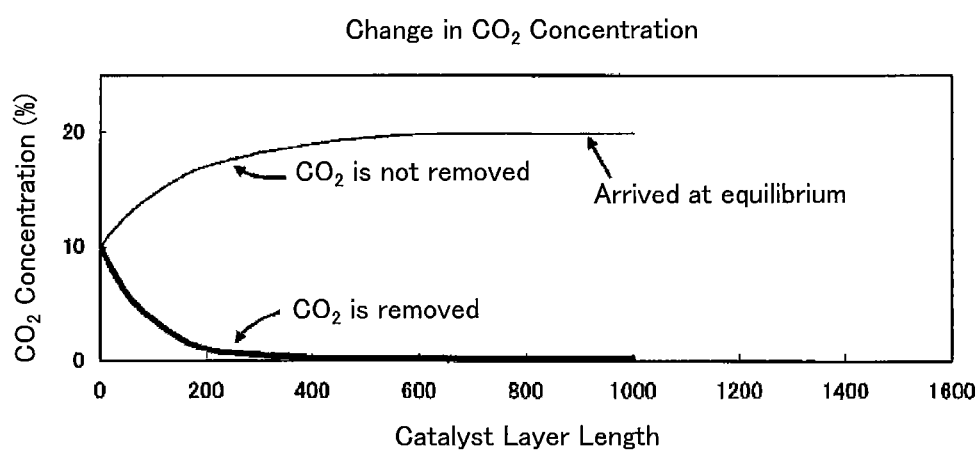

The structure shown in FIGS. 17A-17B has the constitution in which a gel membrane 41 is exposed in a space 40 so that a gel membrane 41 is directly contacted with a feed gas FG. As compared with the structure shown in FIG. 1, the gel membrane 41 is not coated with a hydrophobic membrane. This hydrophobic membrane has the effect of stabilizing the gel membrane and suppressing deterioration of performances with time. However, as shown in FIGS. 19A-19B, a cylindrical facilitated transport membrane has the effect of improving performances with time without being coated with a hydrophobic membrane. The respect will be described below.

FIGS. 19A-19B are graphs in which long-term performances of flat plate type and cylinder type facilitated transport membranes are compared, FIG. 19A shows $CO_2$ permeance $R_{CO2}$, and FIG. 19B shows $CO_2/H_2$ selectivity. In any graph, (1) shows data of a cylinder type one, (2) shows data of a flat plate type one. The conditions used when the results are obtained are the same as those in FIGS. 12A-12B.

In FIGS. 19A-19B, as a flat plate type facilitated transport membrane of Comparative Example, a facilitated transport membrane having a structure in which a gel membrane is not coated with hydrophobic membrane is assumed due to the following reason. Since the cylindrical membrane is in the state where one surface of the gel membrane is exposed to a feed gas, the conditions of the flat plate type one are made identical.

In FIG. 19A, the $CO_2$ permeance does not remarkably vary with time in both flat plate type and cylinder type. In FIG. 19B, the $CO_2/H_2$ selectivity does not remarkably vary with time in the case of a cylinder type facilitated transport membrane, whereas, the selectivity deteriorates with time and deteriorates to about 10% of the maximum after a lapse of 100 hours in the flat plate type facilitated transport membrane. As a result, it is considered that when the gel membrane is not coated with the hydrophobic membrane, the cylindrical facilitated membrane is superior to the flat plate type one in view of long-term performances. As is apparent from FIGS. 12A-12B and FIGS. 16A-16C, satisfactory long-term performances are exhibited by coating the gel membrane with the hydrophobic membrane in the flat plate type one.

It is preferred that the supporting membrane made of ceramics used in the present embodiment has a heat resistance of 100° C. or higher, mechanical strength and tight adhesion with the impregnated gel membrane, similar to the case of the PTFE porous membrane described in the first embodiment. The porosity is preferably 40% or more and the pore diameter is preferably within a range from 0.1 to 1 µm.

With the constitution of FIGS. 17A-17B, the structure is provided with a supporting membrane made of ceramics formed inside and a gel membrane formed outside the supporting membrane. To the contrary, the supporting membrane may be formed outside and the gel membrane may be formed inside the supporting membrane. It is described that the shape is "cylindrical". However, this description does not necessarily require that the cross section has a precise circle shape and may be an oval shape, or may have slight unevenness.

According to the present embodiment, it is shown that long-term performances are improved by using a cylindrical facilitated membrane as compared with a flat plate type one. This reason is considered that the facilitated transport membrane is less likely to be deformed and also stabilized by using a cylindrical shape. In the case of a flat plate type one, it is considered that defects occur as a result of deformation of the membrane with time, and selectivity deteriorates as a result of leakage of $H_2$ from the defects. While a ceramic membrane is used as a supporting membrane in the above Examples, this membrane can be formed into a cylindrical shape and the material is not limited to ceramics as long as it is the material which is less likely to be deformed with time.

While a PTFE porous membrane is used as a supporting membrane in the first and second embodiments, the membrane is not limited to the PTFE porous membrane as long as the flat plate state can be maintained without being broken in the state where the pressure is applied.

Another embodiment will be described below.

(1) In the above respective embodiments, the membrane of the present invention is produced by casting a cast solution which is an aqueous solution containing a PVA/PAA copolymer and $Cs_2CO_3$ as a carbon dioxide carrier on a hydrophilic PTFE porous membrane for gel membrane supporting, and gelating the cast solution. However, the membrane of the present invention may be produced by the method other than this method. For example, the membrane of the present invention may be produced by impregnating a PVA/PAA copolymer gel membrane with an aqueous $Cs_2CO_3$ solution.

(2) While the case of producing a $CO_2$-facilitated transport membrane by adding cesium carbonate as an additive to a gel membrane is described in the above first embodiment, the same effect can be obtained even when cesium hydroxide is used in place of cesium carbonate. This reason is as follows. That is, the reaction represented by Chemical formula 2 shown above is caused by using a gel membrane containing cesium hydroxide added therein to $CO_2$ separation, thereby converting cesium hydroxide into cesium carbonate. Furthermore, even when cesium bicarbonate is used in place of cesium carbonate, the same effect can be obtained by Chemical formula 2 shown above.

Similarly, even when a $CO_2$-facilitated transport membrane is produced by adding rubidium carbonate as an additive to a gel membrane, rubidium hydroxide or rubidium bicarbonate can be used in place of rubidium carbonate.

(3) While the membrane of the present invention has a three-layered structure of hydrophobic PTFE porous membrane/gel layer (impregnated gel membrane supported on hydrophilic PTFE porous membrane)/hydrophobic PTFE porous membrane in the above embodiment, the supporting structure of the membrane of the present invention is not necessarily limited to the three-layered structure. For example, a two-layered structure of hydrophobic PTFE porous membrane/gel layer (impregnated gel membrane supported on hydrophilic PTFE porous membrane) may be used.

(4) While the case of applying the membrane of the present invention to a $CO_2$ permeable membrane reactor was assumed in the above embodiment, the membrane of the present invention can be used for the purpose of selectively separating carbon dioxide, in addition to the $CO_2$ permeable membrane reactor. Therefore, the feed gas to be fed to the membrane of the present invention is not limited to the mixed gas exemplified in the above embodiment.

(5) The mixing ratio in the composition of the membrane of the present invention, and the size of each portion of the membrane in the above embodiment are exemplified for easier understanding of the present invention, and the present invention is not limited to the $CO_2$-facilitated transport membrane of these numerical values.

INDUSTRIAL APPLICABILITY

The $CO_2$-facilitated transport membrane according to the present invention can be used to separate carbon dioxide, and particularly it can be used as a $CO_2$-facilitated transport membrane which can separate carbon dioxide contained in a reformed gas for a fuel cell, containing hydrogen as a main component with high selectivity over hydrogen, and is also for a $CO_2$ permeable membrane reactor.

EXPLANATION OF REFERENCES

1 PVA/PAA gel membrane (gel layer) containing carbon dioxide carrier
2 Hydrophilic porous membrane
3, 4 Hydrophobic porous membrane
10 $CO_2$-facilitated transport membrane (sample)
11 Flow type gas permeation cell
12 Feed side chamber
13 Permeation side chamber
14, 16 Cold trap
15 Back pressure regulator
17 Gas chromatograph
18 Metering pump
19 Back pressure regulator
40 Space
41 Gel membrane
42 Supporting membrane made of ceramics
43 Space
FG Feed gas
SG, SG' Sweep gas

The invention claimed is
1. An apparatus for removing $CO_2$ from a mixed gas containing at least $CO_2$ and $H_2$, wherein:
  the apparatus comprises a $CO_2$-facilitated transport membrane and is adapted to feed the mixed gas to a feed side of the $CO_2$-facilitated transport membrane at 100° C. or higher and to remove the $CO_2$ from the mixed gas at a permeation side of the $CO_2$-facilitated transport membrane;
  the $CO_2$-facilitated transport membrane comprises a gel layer that is supported by a hydrophilic porous membrane and has $CO_2/H_2$ selectivity under a temperature condition of 100° C. or higher;
  the gel layer is formed from a gel membrane containing moisture, a polyvinyl alcohol-polyacrylic acid copolymer gel membrane, and an additive of cesium carbonate or cesium bicarbonate or cesium hydroxide or rubidium carbonate or rubidium bicarbonate or rubidium hydroxide; and
  the gel layer is formed such that a weight ratio of the additive to a total weight of the polyvinyl alcohol-polyacrylic acid copolymer gel membrane and the additive is set to be in a range of 65% to 85%.
2. The apparatus according to claim 1, wherein the $CO_2$-facilitated transport membrane has $CO_2/H_2$ selectivity of 90 or more under a temperature condition of 100° C. or higher.
3. The apparatus according to claim 1, wherein the gel layer is coated with a hydrophobic porous membrane.

4. The apparatus according to claim 1, wherein the gel layer comprises an aldehyde group-derived cross-linking structure.

5. The apparatus according to claim 1, wherein both the gel layer and the hydrophilic porous membrane have a cylindrical shape with the same central axis, and an inner side face of one of either the gel layer or the hydrophilic porous membrane contacts an outer side face of the other of either the gel layer or the hydrophilic porous membrane.

6. The apparatus according to claim 5, wherein the hydrophilic porous membrane comprises a ceramic.

7. The apparatus according to claim 5, wherein the gel layer is formed outside of the hydrophilic porous membrane so as to surround the hydrophilic porous membrane.

8. The apparatus according to claim 1, wherein the additive is cesium carbonate.

9. The apparatus according to claim 1, wherein the additive is rubidium carbonate.

* * * * *

UNITED STATES PATENT AND TRADEMARK OFFICE
CERTIFICATE OF CORRECTION

PATENT NO. : 8,617,297 B2  
APPLICATION NO. : 13/742913  
DATED : December 31, 2013  
INVENTOR(S) : Okada et al.

Page 1 of 1

It is certified that error appears in the above-identified patent and that said Letters Patent is hereby corrected as shown below:

In the Specification

In column 6, line 47, delete "($Rb^2CO_3$)", and insert -- ($Rb_2CO_3$) --.

In column 7, line 56, after "comprising the steps of", insert -- : --.

In column 7, line 66, delete "of;", and insert -- of: --.

In column 12, line 56, delete "μmol/(m$^2$·s·kPa)]", and insert -- [mol/(m$^2$·s·kPa)] --.

In column 13, line 22; column 14, line 15; column 15, line 53; column 18, line 52; column 19, lines 6 and 56; column 20, lines 2 and 46; at each occurrence, delete "$RH_2$", and insert -- $R_{H2}$ --.

In the Claims

In Claim 1, column 24, line 60, after the word "additive", insert -- relative --.

Signed and Sealed this  
Tenth Day of June, 2014

Michelle K. Lee  
*Deputy Director of the United States Patent and Trademark Office*